(12) United States Patent
Patel et al.

(10) Patent No.: US 10,264,481 B2
(45) Date of Patent: Apr. 16, 2019

(54) TECHNIQUES FOR MANAGING POWER OPERATION MODES OF A USER EQUIPMENT (UE) COMMUNICATING WITH A PLURALITY OF RADIO ACCESS TECHNOLOGIES (RATS)

(71) Applicant: QUALCOMM Incorporated, San Diego, CA (US)

(72) Inventors: Umang Sureshbhai Patel, Santa Clara, CA (US); Arnaud Meylan, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 15/066,214

(22) Filed: Mar. 10, 2016

(65) Prior Publication Data
US 2016/0277957 A1   Sep. 22, 2016

Related U.S. Application Data
(60) Provisional application No. 62/135,583, filed on Mar. 19, 2015.

(51) Int. Cl.
| | |
|---|---|
| *H04L 12/26* | (2006.01) |
| *H04W 28/02* | (2009.01) |
| *H04W 76/16* | (2018.01) |
| *H04W 76/28* | (2018.01) |
| *H04W 52/02* | (2009.01) |

(52) U.S. Cl.
CPC ... *H04W 28/0221* (2013.01); *H04W 52/0216* (2013.01); *H04W 52/0229* (2013.01); *H04W 52/0258* (2013.01); *H04W 76/16* (2018.02); *H04W 76/28* (2018.02); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/24* (2018.01)

(58) Field of Classification Search
None
See application file for complete search history.

(56) References Cited

U.S. PATENT DOCUMENTS

| | | | |
|---|---|---|---|
| 2005/0186906 A1 | 8/2005 | Hussmann | |
| 2005/0208966 A1 | 9/2005 | David et al. | |
| 2005/0249227 A1* | 11/2005 | Wang | H04L 47/10 370/412 |

(Continued)

FOREIGN PATENT DOCUMENTS

| | | | |
|---|---|---|---|
| WO | WO-2014/182338 A1 | 11/2014 | |

OTHER PUBLICATIONS

International Search Report and Written Opinion—PCT/US2016/022202—ISA/EPO—dated May 31, 2016. 12 pages.

*Primary Examiner* — Sithu Ko
(74) *Attorney, Agent, or Firm* — Arent Fox LLP

(57) ABSTRACT

Certain aspects described herein relate to wireless communications. A first connection can be established with a first serving node using a first radio access technology (RAT), and a second connection can be established with a second serving node using a second RAT. An indication of a power consumption mode for the first connection can be received, and a power operation mode of the second connection can be determined based at least in part on the indication.

30 Claims, 10 Drawing Sheets

(56) References Cited

U.S. PATENT DOCUMENTS

| | | | |
|---|---|---|---|
| 2008/0198818 A1* | 8/2008 | Montemurro | H04W 48/08 370/338 |
| 2013/0088983 A1* | 4/2013 | Pragada | H04W 16/14 370/252 |
| 2013/0242843 A1 | 9/2013 | Kojima | |
| 2013/0272181 A1 | 10/2013 | Fong et al. | |
| 2014/0211673 A1* | 7/2014 | Lu | H04W 52/0212 370/311 |
| 2015/0029917 A1 | 1/2015 | Kim | |
| 2015/0264610 A1 | 9/2015 | Bhattad et al. | |
| 2015/0282067 A1* | 10/2015 | Zhu | H04W 52/0206 370/311 |
| 2016/0192293 A1* | 6/2016 | Dai | H04W 52/0216 370/238 |
| 2016/0315868 A1* | 10/2016 | Zhang | H04L 47/34 |

* cited by examiner

TECHNIQUES FOR MANAGING POWER OPERATION MODES OF A USER EQUIPMENT (UE) COMMUNICATING WITH A PLURALITY OF RADIO ACCESS TECHNOLOGIES (RATS)

CLAIM OF PRIORITY UNDER 35 U.S.C. § 119

The present application for patent claims priority to Provisional Application No. 62/135,583 entitled "TECHNIQUES FOR MANAGING POWER OPERATION MODES OF A USER EQUIPMENT (UE) COMMUNICATING WITH A PLURALITY OF RADIO ACCESS TECHNOLOGIES (RATS)" filed Mar. 19, 2015, which is assigned to the assignee hereof and hereby expressly incorporated by reference herein.

BACKGROUND

Field of Disclosure

The present disclosure, for example, relates to wireless communication systems, and more particularly to techniques for managing power operation modes of a user equipment (UE) communicating with a plurality of radio access technologies (RATs).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Additionally, UEs can be equipped to communicate in wireless local area networks (WLAN) by accessing one or more hotspots using a wireless communication technology, such as 802.11 (Wi-Fi). In this regard, a UE can communicate with a radio access network (RAN) of a wireless wide area network (WWAN) (e.g., a cellular network) along with a RAN of one or more WLANs. The UE can include a receiver operable for communicating with the RAN of the WWAN (e.g., a long term evolution (LTE), universal telecommunications mobile system (UMTS), or similar receiver) and another receiver operable for communicating with the RAN of the WLAN (e.g., an 802.11 Wi-Fi receiver). The UE may additionally or alternatively include a single receiver operable for communicating with both RANs (e.g., WWAN and WLAN). In either case, connections over the WWAN and WLAN can be aggregated (e.g., at a media access control (MAC), packet data convergence protocol (PDCP) or similar layers), which can be referred to as "RAN aggregation," such to provide simultaneous access to one or more network nodes, to offload traffic from the WWAN to WLAN or vice versa, and/or the like.

In current implementations of RAN aggregation, the WWAN access point schedules downlink communications over the WWAN and WLAN connections for a given UE, and the UE communicates with the WWAN RAN over the WWAN connection and the WLAN RAN over the WLAN connection. The WLAN access point can then communicate data, scheduled by the WWAN, between the UE and the WWAN access point. Thus, on the downlink, data packets from the WWAN and WLAN connections may be split and received out of order at the UE; thus, the UE can reorder out-of-order packets at the MAC, RLC or PDCP layer based on a sequence number associated with the data packets received over the independent WWAN and WLAN connections. It is possible, however, that the UE may enter a power operation mode (e.g., idle mode) over one or more of the connections to save power consumption, scan other channels (e.g., to locate an access point with better radio conditions), etc. In this example, the UE may not have sufficient time to switch to a different power operation mode (e.g., connected mode) to receive data packets over the one or more of the connections to properly perform reordering of the received data packets. Thus, UE may request the data packets to be resent, which may cause unnecessary wasting of resources of the wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure, for example, generally relates to wireless communication systems, and more particularly to techniques for managing power operation modes of a user equipment (UE) communicating with a plurality of radio access technologies (RATs). For example, techniques for managing communications between wireless devices, base stations, and/or access points in a radio access network (RAN) where one or more connections of different radio access technologies (RATS) are in a power operation mode for saving power consumption are described herein.

In accordance with an aspect, a wireless device (e.g., user equipment (UE)) may communicate with access points in multiple RANs using different radio access technologies (RAT) and/or network architectures. For example, the wireless device may communicate with an evolved Node B or other component of a RAN for a wireless wide area network (WWAN) or cellular network, an access point or similar component of a RAN for a WLAN, and/or the like, to access one or more networks. In an example, traffic aggregation (e.g., RAN aggregation) may be implemented where the UE accesses a first network (e.g., WWAN) by using a first RAT with a first access point and a second network (e.g., WLAN) by using a second RAT with a second access point, where the second access point communicates with the first access point to provide traffic aggregation for the UE to the first network. The first and second access points may be a part of or otherwise utilize different RANs. This configuration allows for improved connectivity with the first network and/or the second network, but may cause issues for ordering packets when a connection with at least one of the access points is in a power operation mode for saving power consumption. Thus, for example, the power operation mode and/or communications over the connections with the access points can be managed to ensure that packets are not dropped based on the connection with at least one of the access points in the power operation mode.

In one example, a method for wireless communications is provided. The method includes establishing a first connection with a first serving node using a first RAT, establishing a second connection with a second serving node using a second RAT, wherein the first connection and the second connection are configured for traffic aggregation, receiving an indication of a power consumption mode for the first connection, and determining a power operation mode of the second connection based at least in part on the indication.

The method may also include wherein receiving the indication of the power consumption mode from the first connection comprises determining a reorder status related to reordering packets received over at least one of the first connection or the second connection. The method may further include wherein the reorder status is based on at least one of a second indication that reordering is on-going or not on-going, a time remaining for a packet reorder timer, or a time since the packet reorder timer started. The method may include wherein determining the power operation mode of the second connection comprises exiting the power operation mode based at least in part on determining the reorder status. Also, the method may include wherein receiving the indication of the power consumption mode from the first connection comprises determining whether packets received over at least one of the first connection or the second connection are successfully reordered, and determining the power operation mode of the second connection is based at least in part on determining that the packets are reordered.

The method may also include wherein receiving the indication of the power consumption mode from the first connection comprises determining whether a discontinuous receive (DRX) inactivity timer of the first RAT related to entering another power operation mode for the first RAT following expiration of the DRX inactivity timer is tolling. The method may include wherein determining that the DRX inactivity timer is tolling comprises determining that the DRX inactivity timer is tolling based on receiving a downlink transmission over the first connection. The method may further include wherein receiving the indication of the power consumption mode from the first connection comprises determining whether an on-duration timer of the first RAT related to exiting another power operation mode for the first RAT following expiration of the on-duration timer is expired. Moreover, the method may include wherein receiving the indication is based at least in part on receiving a packet over the first connection.

The method may additionally include wherein receiving the indication comprises receiving a control packet over the first connection or the second connection indicating to exit the power operation mode over the second connection. The method may include wherein determining to exit the power operation mode comprises determining to remain out of the power operation mode until another control packet is received over the first connection or the second connection indicating that the power operation mode is allowed for the second connection. Also, the method may include wherein the control packet indicates a time at which to enter the power operation mode.

In another example, an apparatus for wireless communications is provided. The apparatus includes a transceiver, a memory configured to store instructions, and at least one processor communicatively coupled with the transceiver and the memory. The at least one processor is configured to establish a first connection with a first serving node using a first RAT, establish a second connection with a second serving node using a second RAT, wherein the first connection and the second connection are configured for traffic aggregation, receive an indication of a power consumption mode for the first connection, and determine a power operation mode of the second connection based at least in part on the indication.

The apparatus may further include wherein the at least one processor is configured to receive the indication of the power consumption mode from the first connection based at least on determining a reorder status related to reordering packets received over at least one of the first connection or the second connection. The apparatus may also include wherein the reorder status is based on at least one of a second indication that reordering is on-going or not on-going, a time remaining for a packet reorder timer, or a time since the packet reorder timer started. Additionally, the apparatus may include wherein the at least one processor is configured to determine the power operation mode of the second connection based at least on exiting the power operation mode based at least on determining the reorder status.

The apparatus may also include wherein the at least one processor is configured to receive the indication of the power consumption mode from the first connection based at least on determining whether packets received over at least one of the first connection or the second connection are successfully reordered, and wherein the at least one processor is configured to determine the power operation mode of the second connection based at least on determining that the packets are reordered. The apparatus may further include wherein the at least one processor is configured to receive the indication of the power consumption mode from the first connection based at least on determining whether a discontinuous receive (DRX) inactivity timer of the first RAT related to entering another power operation mode for the first RAT following expiration of the DRX inactivity timer is tolling. The apparatus may also include wherein the at least one processor is configured to determine that the DRX inactivity timer is tolling based at least on determining that the DRX inactivity timer is tolling based on receiving a downlink transmission over the first connection. Further, the apparatus may include wherein the at least one processor is configured to receive the indication of the power consumption mode from the first connection based at least on determining whether an on-duration timer of the first RAT related to exiting another power operation mode for the first RAT following expiration of the on-duration timer is expired.

The apparatus may also include wherein the at least one processor is configured to receive the indication based at least in part on receiving a packet over the first connection. Also, the apparatus may include wherein the at least one processor is configured to receive the indication based at least on receiving a control packet over the first connection or the second connection indicating to exit the power operation mode over the second connection.

According to another example, a method for wireless communications is provided. The method includes serving a UE over a first connection using a first RAT, determining whether the UE is configured in a power operation mode associated with a second connection with an access point using a second RAT, scheduling data for the second connection during a first time interval based at least in part on the determination that the UE is configured in the power operation mode associated with the second connection, and scheduling data on the first connection and the second connection during a second time interval.

The method can also include wherein scheduling data on the first connection and the second connection is based at least in part on determining that the UE exits the power operation mode over the second connection. The method may also includes wherein determining the second connection is in the power operation mode and scheduling data on the second connection for the first time interval is based at least in part on a size of a data buffer available for transmitting to the UE. Additionally, the method may include scheduling at least one packet on the second connection during an inactivity timer interval related to the second RAT to keep the second connection out of the power operation mode. The method may also include signaling the inactivity timer interval to the UE in radio resource control signaling. Further, the method may include refraining from scheduling the at least one packet on the second connection based at least in part on determining that a size of a data buffer available for transmitting to the UE is less than a threshold.

In another example, an apparatus for wireless communications is provided. The apparatus includes a transceiver, a memory configured to store instructions, at least one processor communicatively coupled with the transceiver and the memory. The at least one processor is configured to serve a UE over a first connection using a first RAT, determine whether the UE is configured in a power operation mode associated with a second connection with an access point using a second RAT, schedule data for the second connection during a first time interval based at least in part on the determination that the UE is configured in the power operation mode associated with the second connection, and schedule data on the first connection and the second connection during a second time interval.

The apparatus may also include wherein the at least one processor is configured to schedule data on the first connection and the second connection based at least on determining that the UE exits the power operation mode over the second connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the described aspects, reference is now made to the accompanying drawings, in which like elements are referenced with like numerals. These drawings should not be construed as limiting the aspects described herein, but are intended to be illustrative only.

DETAILED DESCRIPTION

Figure 1:
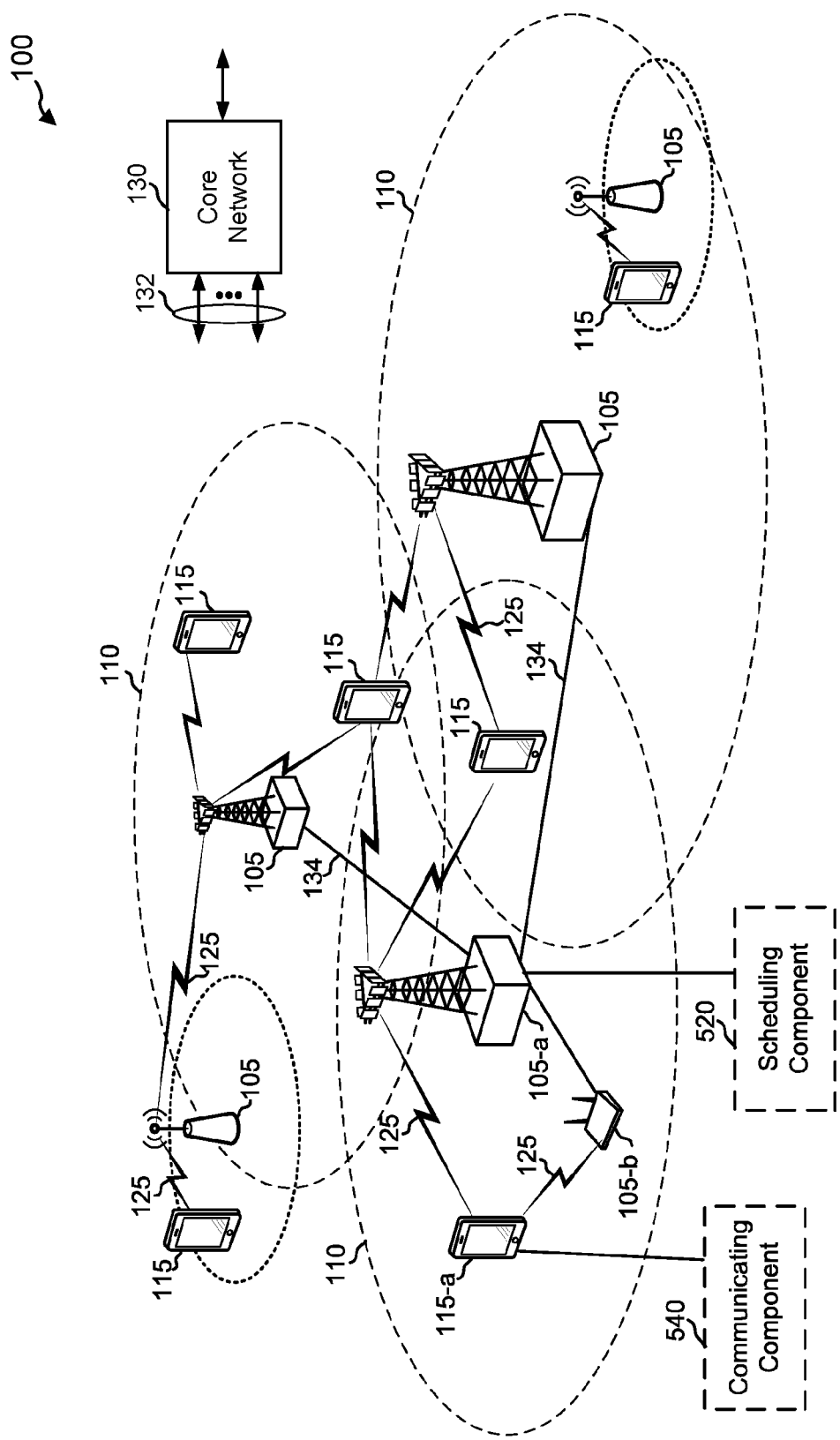
FIG. 1 is a block diagram conceptually illustrating an example of a wireless communications system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques for scheduling communications in wireless networks with traffic aggregation are described. For example, a wireless device (e.g., user equipment (UE)) can communicate with a first access point using a first RAT to access a first wireless network, and can communicate with a second access point using a second RAT, where the second access point may facilitate additional access to the first wireless network via the first access point. For example, the second access point, which may be a part of a different radio access network (RAN) than the first access point, can enable communication between the first network and a wireless device by communicating with the first access point (e.g., over a backhaul link). In this regard, the wireless device can connect to the first access point and the second access point, using the first and second RATs respectively, to access the first wireless network. Packets may be concurrently communicated to the wireless device from the first and second access points, and may arrive and be processed by the wireless device out of order. Accordingly, the wireless device may reorder the packets based at least in part on a sequence number indicated for each packet received from the first and second access points. The reordering of packets or other data units may occur at one or more network layers, such as a media access control (MAC) layer, radio link control (RLC) layer, packet data convergence protocol (PDCP) layer, internet protocol (IP) layer, transmission control protocol (TCP) or TCP/IP layer, user datagram protocol (UDP) or UDP/IP layer, an application layer, etc.

In an example, the wireless device may enter a power operation mode over a connection with the first or second access point. The power operation mode can relate to a power saving mode or other mode during which the wireless device may cease communicating. The power operation mode can include suspending radio resources of the wireless device for the related connection during certain time periods, such that signals cannot be received or transmitted during the time period. This, however, may inhibit packet reordering at the wireless device because some packets may not be received over the connection in the power operation mode, and the first and/or second access point that has an active connection with the wireless device may not know the other connection is in the power operation mode. Thus, the packet reordering may be interrupted, and packets may be dropped if the packets are not received and reordered within a certain time period.

In a specific example, a wireless device may decide to enter a power operation mode over a connection with an access point to save power (e.g., based at least in part on detecting data transmit/receive traffic inactivity over the connection, determining to scan to discover other access points on different channels during periods of time defined by the power operation mode, etc.). When the wireless device is in the power operation mode, the access point may buffer the packets destined to the wireless device until the packets are requested or the device otherwise exits the power operation mode. In some examples, the access point may keep a traffic indication map (TIM) bit set in beacons for the wireless device in the power operation mode to notify the wireless device about buffered data packets. This can allow the wireless device to detect that the access point has buffered data packets for the wireless device, and the wireless device can accordingly request the data packets (e.g., using a power save-poll (PS-Poll) in Wi-Fi or a similar function) and/or exit the power operation mode and notify the access point so the access point can transmit buffered data packets for the wireless device.

In this regard, when the wireless device is in the power operation mode, data packets may get buffered on the access point for a variable amount of time, from a few milliseconds to hundreds of milliseconds, before being transmitted. Various factors may influence the variable buffered duration, such as a beacon transmission interval (e.g., 100 milliseconds (ms) in Wi-Fi), data packet arrival time at the access point with respect to a next beacon transmission, delayed beacon transmission due to the transmission medium being busy at the target beacon transmission time (TBTT) at the access point, wireless device behavior to skip some beacons when in the power operation mode (e.g., some wireless devices may process beacons only at multiple of delivery traffic indication map (DTIM) intervals, missed/lost beacons (e.g., due to collision on the transmission medium), time taken for PS-Poll handshake or for an indication to exit the power operation mode indication from the wireless device to the access point, etc.

In any case, a reordering timeout on the wireless device (e.g., at the PDCP layer) may be a smaller value than the varying buffering duration on the access point when the wireless device is in the power operation mode (e.g., 65 ms). This may cause frequent reorder timeouts on the wireless device when packets (e.g., PDCP packets) on the other aggregated connection are received, but packets sent over the connection in the power operation mode are delayed due to buffering at the access point and there are one or more packets in the reorder queue. The reorder timeout may cause flushing of packets from reorder queue to upper layers (e.g., flushing of PDCP packets to UDP/IP, TCP/IP, etc. layers), which can experience lost packets and impact end-to-end applications. In addition to reordering timeout, flushing of packets may be triggered when the memory used by packets to be reordered becomes too large. Buffered PDCP packets from the access point may likely ultimately reach the wireless device, but this may be after the reorder timeout after which the wireless device's PDCP layer reorder window moves, and the delayed PDCP packets are no longer used and are dropped. In addition, any amount of reordering may increase processing burden at the wireless device, which may have a negative impact on device power, and/or may require additional memory to temporarily store out-of-order packets.

Accordingly, aspects described herein relate to avoiding such packet losses over aggregated connections that allow power operation modes. Various mechanisms can be used at the wireless device and/or access point to handle power operation modes to receive packets transmitted over related connections. For example, a wireless device receiving communications over a first connection from a first access point can determine whether a second connection with a second access point is in a power operation mode. The power operation mode, for example, can include substantially any full power or limited power operation mode, such as a connected mode where the second connection has active resources for communicating with the access point, an idle mode where the second connection may be limited to periodically receiving paging signals over certain resources, a sleep or powered off mode where a transceiver, or other radio frequency (RF) front end components, related to the second connection are powered down for a period of time, etc. In any case, the wireless device may determine the power operation mode for the second connection by exiting or switching the power operation mode for the second connection (e.g., to a connected mode or other full power mode) based on one or more aspects of communications over the first and/or second connection (e.g., aspects related to receiving communications over the first connection, reordering of received packets, determining tolling or expiration of timers related to receiving communications over the first connection, receiving a control packet, etc.). Specifically, for example, the one or more aspects of communication may correspond to an indication of a power consumption mode over the first and/or second connection, where the indication of the power consumption mode may include substantially any indication that power is being used by the wireless device over the first and/or second connection, such as a reorder status related to reordering packets received over the first connection and/or the second connection, an indication or determination of a time remaining for a packet reorder timer, an indication or determination as to whether packets received over the first connection and/or the second connection are successfully reordered, an indication or determination as to whether a discontinuous receive (DRX) inactivity timer of the first RAT related to entering another power operation mode for the first RAT following expiration of the DRX inactivity timer is tolling, an indication or determination as to whether an on-duration timer of the first RAT related to exiting another power operation mode for the first RAT following expiration of the on-duration timer is expired, receiving a downlink transmission over the first connection, receiving a control packet over the first connection or the second connection indicating to exit the power operation mode over the second connection, etc.

In another example, the first access point can determine whether the second connection is in a power operation mode (e.g., based on information from the second access point) and can accordingly avoid providing data to the second access point for transmitting to the wireless device via the second connection. In yet another example, the first access point can instruct the wireless device to exit the power operation mode over the second connection (e.g., by transmitting a control packet to the wireless device) and can accordingly provide data to the second access point for transmitting to the wireless device over the second connection.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with aspects described herein. The wireless communications system 100 includes base stations (or cells) 105, user equipment (UEs) 115, and a core network 130. One or more of the base stations 105 can optionally include and/or can be coupled with a scheduling component 520, as described further herein, for determining when to schedule communications to one or more UEs 115 over multiple connections in traffic aggregation based on a power operation mode determined for at least one of the multiple connections. One or more of the UEs 115 can optionally include and/or can be coupled with a communicating component 540, as described further herein, for managing a power operation mode over one or more of multiple connections in traffic aggregation to facilitate receiving communications over the one or more connections for reordering thereof. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In some embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies. In general, base stations 105-a may be base stations corresponding to a WWAN (e.g., LTE or UMTS macro cell, pico cell, femto cell, etc. base stations), and base stations 105-b may be base stations corresponding to a WLAN (e.g., Wi-Fi hotspot). It is to be appreciated, however, that a single base station 105 can support communications over multiple RATs (e.g., LTE and Wi-Fi, LTE and UMTS, UMTS and Wi-Fi, etc.).

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNodeBs 105. The eNodeBs 105 that are used for carrier aggregation may be collocated or may be connected through fast connections. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects.

In addition, for example, some base stations 105 can support traffic aggregation such that base stations using different RATs can communicate to aggregate traffic from both base stations (e.g., for a given UE 115), which may be enabled based on carrier aggregation as described above. For example, UE 115-a can communicate with base station 105-a and base station 105-b, and base station 105-b can communicate with base station 105-a to coordinate aggregation of traffic to/from UE 115-a from/to the base station 105-a for communicating to a related WWAN. Thus, in one example, UE 115-a may support LTE and Wi-Fi communications using one or more transceivers. In this regard, for example, traffic aggregation can be established for the UE 115-a such that UE 115-a communicates data for a first wireless network to base station 105-a and base station 105-b, which operate different RANs, using respective RATs. Base station 105-b can provide the data to/from base station 105-a for communicating in the related first wireless network. This configuration allows for increased throughput or other improved connectivity properties for the UE 115-a. Moreover, traffic aggregation in this regard may occur at one or more network layers having packets or data units with corresponding sequence numbers such that the packets or data units may be received out of order at the UE 115-a such that the UE 115-a can reorder the packets. For example traffic aggregation may occur over a MAC layer, RLC layer, PDCP layer, IP layer, TCP or TCP/IP layer, UDP or UDP/IP layer, one or more application layers, etc.

Figure 2:
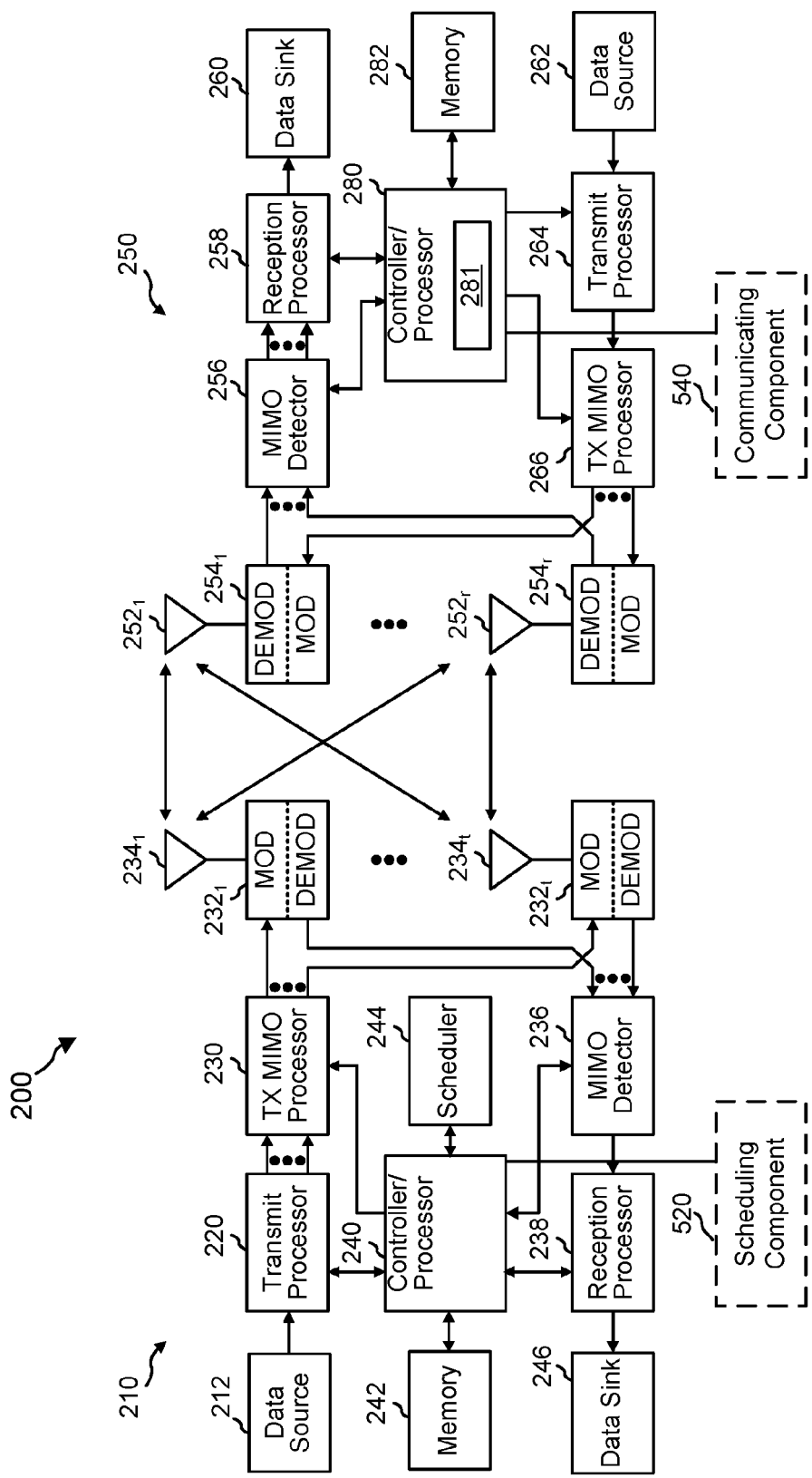
FIG. 2 is a block diagram conceptually illustrating examples of an eNodeB and a UE configured in accordance with various aspects of the present disclosure.

FIG. 2 is a block diagram conceptually illustrating examples of an eNodeB 210 and a UE 250 configured in accordance with aspects described herein. For example, the base station/eNodeB 210 and the UE 250 of a system 200, as shown in FIG. 2, may be one of the base stations/eNodeBs and one of the UEs in FIG. 1, respectively. Thus, base station/eNodeB 210 can optionally include and/or be coupled with a scheduling component 520, as described further herein, for determining when to schedule communications to one or more UEs 250 over multiple connections in traffic aggregation based on a power operation mode determined for at least one of the multiple connections. UE 250 can optionally include and/or be coupled with a communicating component 540, as described further herein, for managing a power operation mode over one or more of multiple connections in traffic aggregation to facilitate receiving communications over the one or more connections for reordering thereof. In some aspects, the eNodeB 210 may support traffic aggregation, as described herein. In some aspects, the UE 250 may also support traffic aggregation. The UE 250 may receive configuration information for traffic aggregation from eNodeB 210 or other network entities. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIG. 5, and/or other processes for the techniques described herein (e.g., flowcharts illustrated in FIGS. 6 and 8-10). In some aspects, at least a portion of the execution of these functional blocks and/or processes may be performed by block 281 in the UE controller/processor 280. The base station memory 242 and the UE memory 282 may store data and program codes for the base station 210 and the UE 250, respectively. For example, the UE memory 282 may store configuration information for multiple connectivity provided by the base station 210 and/or another base station. A scheduler 244 may be used to schedule UE 250 for data transmission on the downlink and/or uplink.

In one configuration, the UE 250 may include means for establishing a first connection with a first serving node using a first RAT, and establishing a second connection with a second serving node using a second RAT, means for receiving an indication of a power consumption mode for the first connection, and/or means for determining a power operation mode of the second connection based at least in part on the indication. In one aspect, the aforementioned means may be (and/or may be coupled with) the UE controller/processor 280, the UE memory 282, the UE reception processor 258, the UE MIMO detector 256, the UE modulators/demodulators 254, and/or the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 5.

In one configuration, the base station 210 may include means for serving a UE over a first connection using a first RAT, means for determining whether the UE is configured in a power operation mode associated with a second connection with an access point using a second RAT, means for scheduling data for the second connection during a first time interval based at least in part on the determination that the UE is configured in the power operation mode associated with the second connection, and/or means for scheduling data on the first connection and the second connection during a second time interval. Base station 210 may also include means for communicating with the UE over a second connection via an access point that uses a second RAT, means for transmitting a control packet to the UE over the first connection or the second connection indicating to exit a power operation mode over the second connection, and/or means for scheduling data for transmission on the first connection and the second connection based at least in part on transmitting the control packet. Base station 210 may further include means for determining whether the second connection is in a power operation mode based at least in part on receiving information from an access point indicating whether the second connection is in the power operation mode, and/or means for scheduling data for transmission on the first connection and the second connection based at least in part on whether the second connection is in the power operation mode. In one aspect, the aforementioned means may be (and/or may be coupled with) the base station controller/processor 240, the base station memory 242, the base station reception processor 238, the base station MIMO detector 236, the base station modulators/demodulators 232, and/or the base station antennas 234 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 5.

Figure 3:
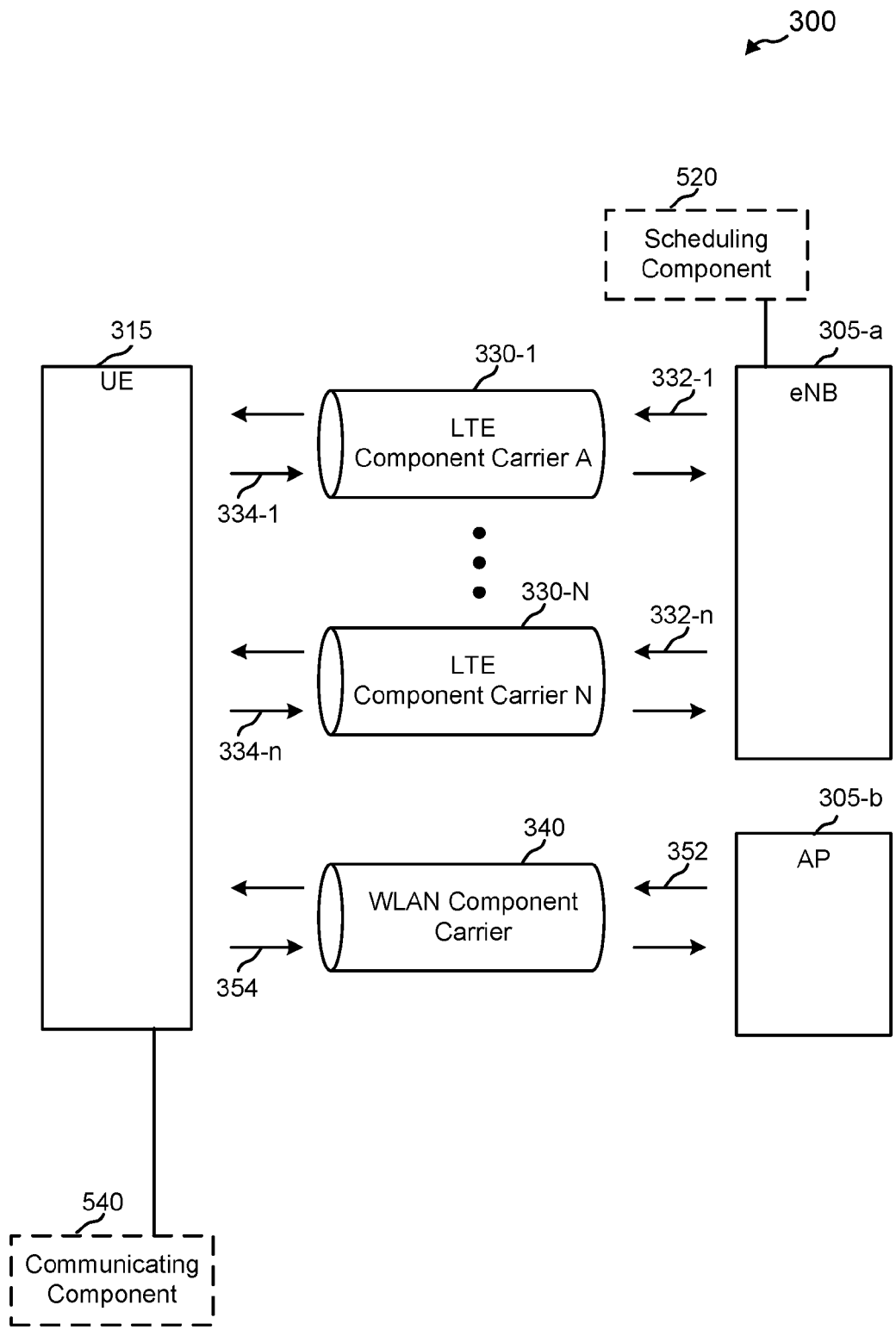
FIG. 3 is a block diagram conceptually illustrating an aggregation of radio access technologies at a UE, in accordance with various aspects of the present disclosure.

FIG. 3 is a block diagram conceptually illustrating an aggregation of radio access technologies at a UE, in accordance with aspects described herein. The aggregation may occur in a system 300 including a multi-mode UE 315, which can communicate with an eNodeB 305-*a* using one or more component carriers 1 through N ($CC_1$-$CC_N$), and/or with a WLAN access point (AP) 305-*b* using WLAN component carrier 340. eNodeB 305-*a* can optionally include and/or be coupled with a scheduling component 520, as described further herein, for determining when to schedule communications to one or more UEs 315 over multiple connections in traffic aggregation based on a power operation mode determined for at least one of the multiple connections. UE 315 can optionally include and/or be coupled with a communicating component 540, as described further herein, for managing a power operation mode over one or more of multiple connections in traffic aggregation to facilitate receiving communications over the one or more connections for reordering thereof. A multi-mode UE in this example may refer to a UE that supports more than one radio access technology (RAT). For example, the UE 315 supports at least a WWAN radio access technology (e.g., LTE) and a WLAN radio access technology (e.g., Wi-Fi). A multi-mode UE may also support carrier aggregation using one or more of the RATs. The UE 315 may be an example of one of the UEs of FIG. 1, FIG. 2, FIG. 3, FIG. 4, and FIG. 5. The eNodeB 305-*a* may be an example of one of the eNodeBs or base stations of FIG. 1, FIG. 2, FIG. 3, FIG. 4, and FIG. 5. While only one UE 315, one eNodeB 305-*a*, and one AP 305-*b* are illustrated in FIG. 3, it will be appreciated that the system 300 can include any number of UEs 315, eNodeBs 305-*a*, and/or APs 305-*b*. In one specific example, UE 315 can communicate with one eNB 305 over one LTE component carrier 330 while communicating with another eNB 305 over another component carrier 330.

The eNodeB 305-*a* can transmit information to the UE 315 over forward (downlink) channels 332-1 through 332-N on LTE component carriers $CC_1$ through $CC_N$ 330. In addition, the UE 315 can transmit information to the eNodeB 305-*a* over reverse (uplink) channels 334-1 through 334-N on LTE component carriers $CC_1$ through $CC_N$. Similarly, the AP 305-*b* may transmit information to the UE 315 over forward (downlink) channel 352 on WLAN component carrier 340. In addition, the UE 315 may transmit information to the AP 305-*b* over reverse (uplink) channel 354 of WLAN component carrier 340.

In one example, eNB 305-*a* can configure UE 315 to utilize component carrier 330-1 (and/or component carriers 330-1 to 330-N) as well as WLAN component carrier 340 to communicate data to a network corresponding to eNB 305-*a*. In one example, multiple WLAN component carriers 340 may be present. In this regard, traffic aggregation is provided by AP 305-*b* communicating traffic received over WLAN component carrier 340 to eNB 305-*a* and communicating traffic from eNB 305-*a* over WLAN component carrier 340 to UE 315. Thus, eNB 305-*a* can utilize the various carriers (at least component carrier 330-1 and WLAN component carrier 340) to facilitate communication between UE 315 and a corresponding network. UE 315 may also be configured to access another network related to AP 305-*b* or another WLAN AP. Because the described configuration may be agnostic to higher layers and/or a user of the UE 315, this may result in inconsistencies between expected and actual network discovery and selection for WLAN at the UE 315. Aspects described herein define operation of UE 315 where WLAN component carrier 340 supports traffic aggregation from UE 315 to eNB 305-*a* using the various component carriers 330-1 to 330-N and 340, where traffic aggregation can occur at one or more network layers, as described, to reorder packets or other data units that may be received out of sequence.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

Figure 4:
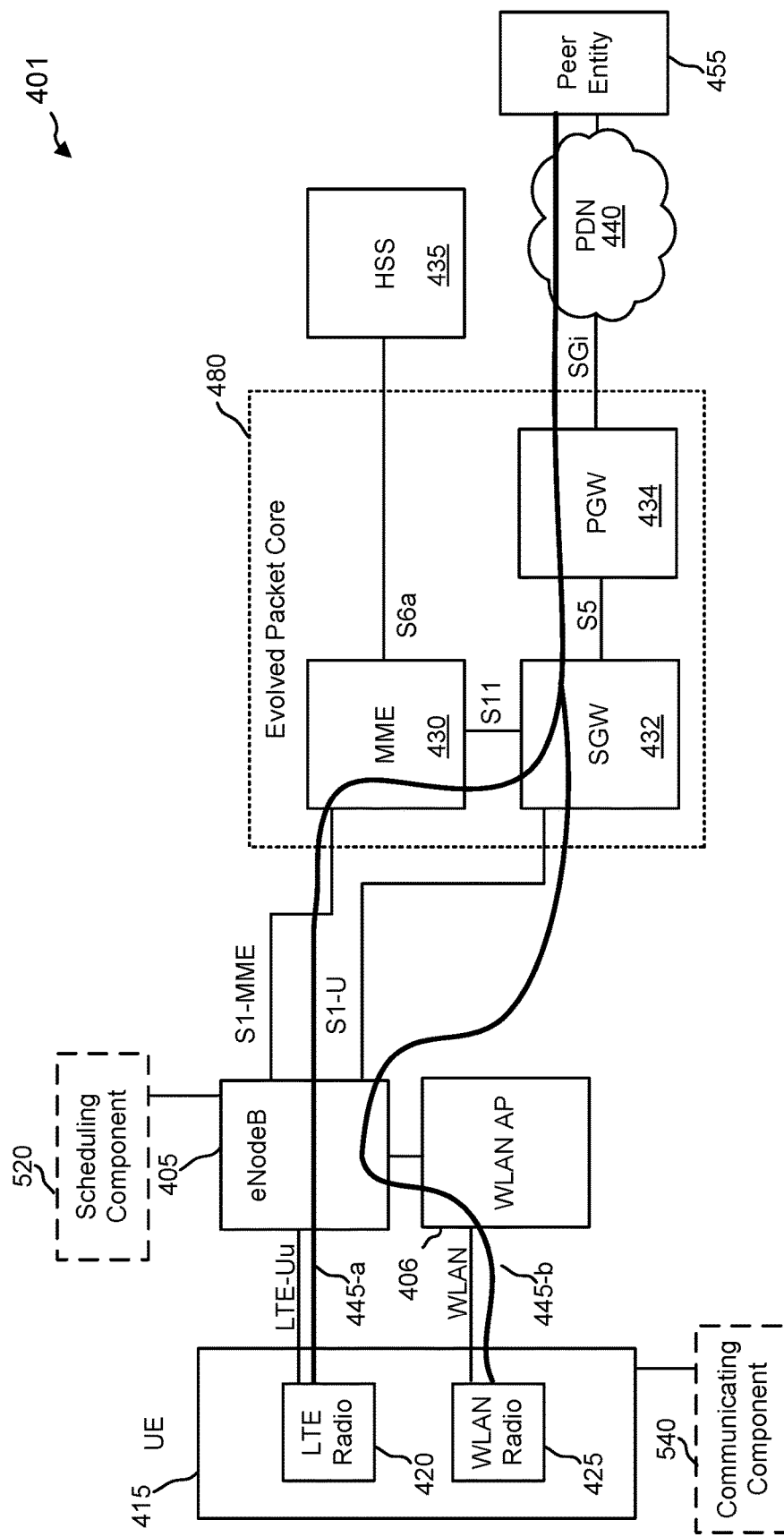
FIG. 4 is a block diagram conceptually illustrating an example of data paths between a UE and a PDN in accordance with various aspects of the present disclosure.

FIG. 4 is a block diagram conceptually illustrating an example of data paths 445-*a* and 445-*b* between the UE 415 and the EPC 480 in accordance with an aspect of the aspects described herein. eNodeB 405 can optionally include and/or be coupled with a scheduling component 520, as described further herein, for determining when to schedule communications to one or more UEs 415 over multiple connections in traffic aggregation based on a power operation mode determined for at least one of the multiple connections. UE 415 can optionally include and/or be coupled with a communicating component 540, as described further herein, for managing a power operation mode over one or more of multiple connections in traffic aggregation to facilitate receiving communications over the one or more connections for reordering thereof. The data paths 445-*a*, 445-*b* are shown within the context of a wireless communications system 401 for aggregating traffic for transmitting using resources of eNodeBs 405 and WLAN AP 406. This bearer configuration includes data path 445-*a* that traverses eNodeB 405, and a data path 445-*b* that traverses WLAN AP 406 and eNodeB 405 in traffic aggregation (e.g., RAN aggregation). The system 200 of FIG. 2 may be an example of portions of the wireless communications system 401.

The wireless communications system 401 may include a UE 415, eNodeB 405, WLAN AP 406, an evolved packet core (EPC) 480, a PDN 440, and a peer entity 455. The UE 415 may be configured to support traffic aggregation, as described herein, though the traffic aggregation can be controlled by eNodeB 405 and may be agnostic to upper layers of the UE 415. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. It is to be appreciated that the UE 415 can include one or more such radios and/or the radios may be integrated. Thus, in an example, LTE radio 420 can also include a WLAN radio (or can be configured to process WLAN signals) in addition to the WLAN radio 425, and in this example, UE 415 includes two WLAN interfaces—one in the LTE radio 420 and one in the WLAN radio 425. These elements may represent aspects of one or more of their counterparts described above with reference to the previous or subsequent Figures. For example, the UE 415 may be an example of UEs in FIG. 1, FIG. 2, FIG. 3, FIG. 5, the eNodeB 405-*a* may be an example of the eNodeBs/base stations of FIG. 1, FIG. 2, FIG. 3, FIG. 5, WLAN AP 406 may be an example of the APs described in FIG. 1, FIG. 3, FIG. 5, and/or the EPC 480 may be an example of the core network of FIG. 1.

In an example, eNodeB 405-*a* may be capable of providing the UE 415 with access to the PDN 440, which may relate to one or more LTE component carriers, as described. In addition, for example, WLAN AP 406 may be capable of providing the UE 415 with access to the PDN 440 by traversing the eNodeB 405. Thus, eNodeB 405 and WLAN AP 406 can communicate to aggregate traffic to/from UE 415. Accordingly, the UE 415 may involve traffic aggregation where one connection is to a first access point (eNodeB 405) and the other connection is to a second access point (WLAN AP 406), where the second access point communicates with the first access point to aggregate traffic for the UE 415. Using this configuration, bearers and/or related component carriers (e.g., as in FIG. 3) established for the UE 415 with EPC 480 can be with the eNodeB 405 and/or the WLAN AP 406. In one example, bearer selection can be configured where the UE 415 has separate bearers established between the EPC 408 and the eNodeB 405 and between the EPC 480 and the WLAN AP 406 (via eNodeB 405). In this example, data traffic (e.g., IP packets or other data units) is sent over respective bearers, which can map to carriers between the UE 415 and eNodeB 405/WLAN AP 406. In another example, RLC/PDCP level aggregation can be configured where the UE 415 bearers are between the eNodeB 405 EPC 480 even for the WLAN AP 406 carriers. In this example, data traffic (e.g., IP packets) is aggregated at the RLC/PDCP level and communicated to UE 415 or respective carriers with the eNodeB 405 and WLAN AP 406.

For example, downlink (DL) PDCP packets from eNodeB 405 to UE 415 can be split across LTE and WLAN connections for receipt by LTE radio 420 and WLAN radio 425. For example, eNodeB 405 can schedule DL PDCP packets over the WLAN (e.g. for traversing data path 445-*b* from eNodeB 405 to WLAN AP 406 to UE 415. UE 415 may receive out-of-order PDCP packets as LTE and WLAN link layer transmissions happen independently. Thus, UE 415 can be configured to reorder packets at PDCP layer (or other data units in other network layer in traffic aggregation, as described) based on sequence number, before sending packets to upper layers. Moreover, in this regard, UE 415 can define a reordering timeout to flush out packets held in a reorder queue and move the reordering window, and if a missing sequence numbered packet creates reorder hole and UE 415 does not receive that packet before reorder timeout expires, this can create data loss at upper layers. This scenario can be mitigated using aspects described herein to control power operation mode of one connection based on a power consumption mode of another connection.

While aspects of FIG. 4 have been described with respect to LTE, similar aspects regarding aggregation and/or multiple connections may also be implemented with respect to UMTS or other similar system or network wireless communications radio technologies.

Figure 5:
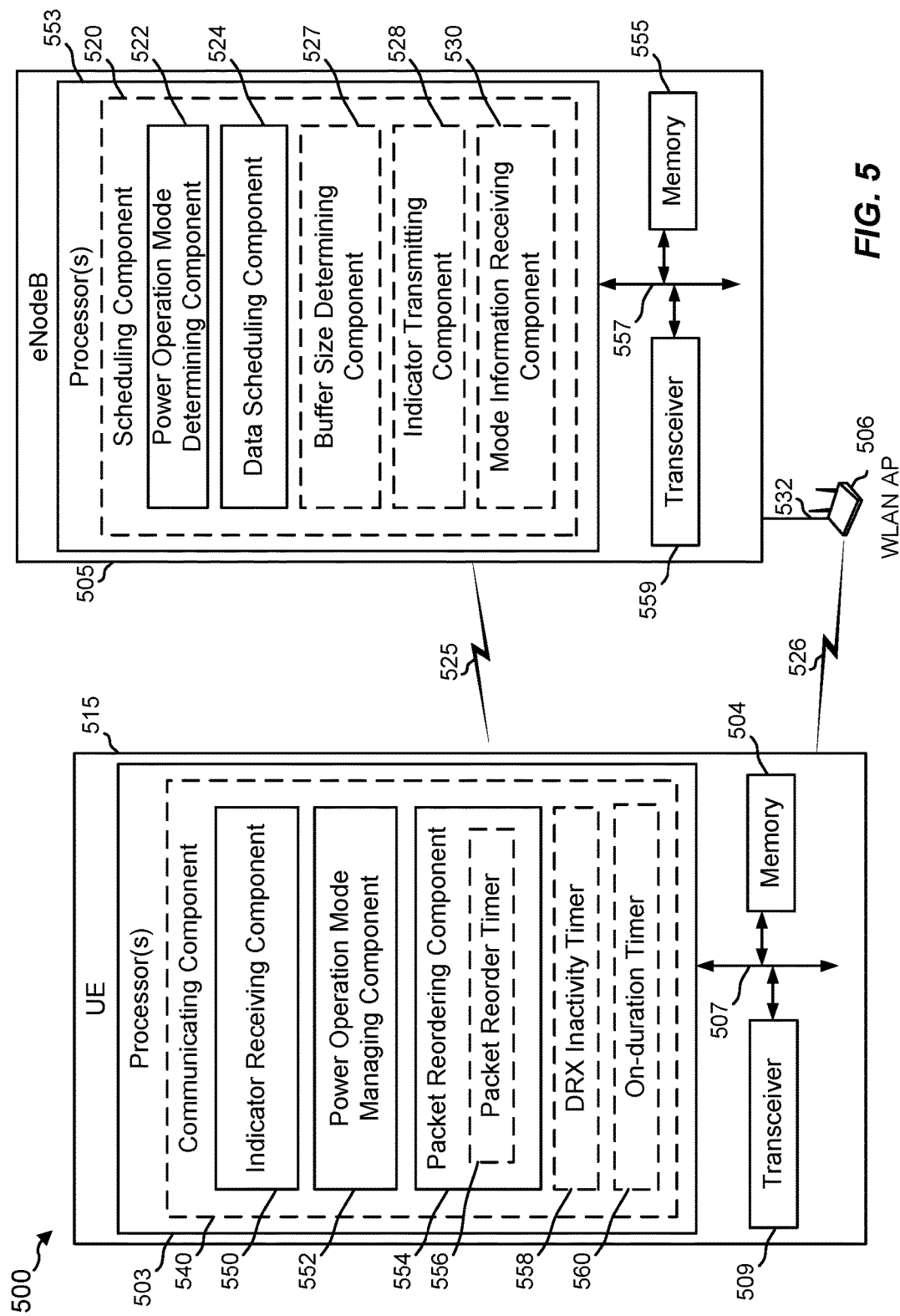
FIG. 5 is a block diagram conceptually illustrating an example of a UE and eNodeB, along with respective components configured in accordance with various aspects of the present disclosure.

FIG. 5 is a block diagram 500 conceptually illustrating an example of an eNodeB 505, UE 515, and components configured in accordance with aspects described herein. FIGS. 6 and 8-10, which are described in conjunction with FIG. 5 herein, illustrate example methods 600, 800, 900, and 1000 in accordance with aspects described herein. Although the operations described below in FIGS. 6 and 8-10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 5, a base station/eNodeB 505, a WLAN AP 506, and the UE 515 of block diagram 500 may be one of the base stations/eNodeBs, APs, and/or UEs as described in various Figures. For example, UE 515 can communicate with an eNB 505 to access a wireless network, examples of which are described in FIGS. 1-4. In an example, UE 515 may include a UE 115, UE 250, UE 315, UE 415, etc., eNB 505 may include an access point 105, eNodeB 210, eNodeB 305-*a*, eNodeB 405, etc., and WLAN AP 506 may include an access point 105, AP 305-*b*, WLAN AP 406, etc. In an aspect, eNB 505 and UE 515 may have established one or more downlink channels over which to communicate via downlink signals, which can be transmitted by eNB 505 (e.g., via transceiver 559) and received by UE 515 (e.g., via transceiver 509) for communicating control and/or data messages (e.g., in signaling) from the eNB 505 to the UE 515 over configured communication resources. Moreover, for example, eNB 505 and UE 515 may have established one or more uplink channels over which to communicate via uplink signals, which can be transmitted by UE 515 (e.g., via transceiver 509) and received by eNB 505 (e.g., via transceiver 559) for communicating control and/or data messages (e.g., in signaling) from the UE 515 to the eNB 505 over configured communication resources.

In an example, eNodeB 505 and the UE 515 may communicate downlink and/or uplink communications over first communication link 525 using a first radio access technology (RAT) (e.g., WWAN RAT, such as LTE). The WLAN AP 506 and the UE 515 may also communicate over second communication link 526 using a second radio access technology (RAT) (e.g., WLAN RAT). Though not shown, it is to be appreciated that WLAN AP 506 can also include a transceiver for communicating signals with the UE 515 using the second RAT. Each of the communication links 525, 526 may be an example of the communication links 125 of FIG. 1. In addition, for example, eNodeB 505 can communicate with WLAN AP 506 to configure and provide traffic aggregation, which also may be referred to as RAN aggregation, for the UE 515, such that traffic can be communicated between UE 515 and a network related to eNodeB 505 by using radio access via the eNodeB 505 and WLAN AP 506 (e.g., where the WLAN AP 506 can receive/provide traffic from/to the eNodeB 505 for communicating to/from the UE 515 over backhaul link 532 or other link between eNodeB 505 and WLAN AP 506). It is to be appreciated that other connections can be aggregated for the UE 515 in addition or alternatively to one or more of the connection with eNodeB 505 and/or WLAN AP 506. For example, other connections can be aggregated for one or more additional or alternative RATs at the UE 515, and concepts described herein may be applied to handle power operation modes over one or more of the RATs to avoid packets loss in traffic aggregation.

In an aspect, UE 515 may include one or more processors 503 and/or a memory 504 that may be communicatively coupled, e.g., via one or more buses 507, and may operate in conjunction with or otherwise implement a communicating component 540 for communicating with eNodeB 505 as the first access point using a RAT of the eNodeB 505 (e.g., LTE, UMTS, etc.) to access a first wireless network (e.g., using first communication link 525, also referred to herein as a first connection), and communicating with WLAN AP 506 as the second access point using a RAT of the WLAN AP 506 (e.g., 802.11 Wi-Fi) to access a second wireless network (e.g., using second communication link 526, also referred to herein as a second connection). In one example, eNodeB 505 can configure traffic aggregation for UE 515 such that UE 515 communicates with both eNodeB 505 and WLAN AP 506 over respective first communication link 525 and second communication link 526 to access a network related to the eNodeB 505, as described. In this regard, as described, WLAN AP 506 can communicate UE 515 traffic with the eNodeB 505 over backhaul link 532 to provide the traffic aggregation for the UE 515 via second communication link 526.

For example, the various operations related to communicating component 540 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 509. Further, for example, the memory 504 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 504 or computer-readable storage medium may be resident in the one or more processors 503, external to the one or more processors 503, distributed across multiple entities including the one or more processors 503, etc.

In particular, the one or more processors 503 and/or memory 504 may execute actions or operations defined by communicating component 540 or its subcomponents. For instance, the one or more processors 503 and/or memory 504 may execute actions or operations defined by an indicator receiving component 550 for receiving an indicator of a power consumption mode related to the first connection to eNodeB 505. In an aspect, for example, indicator receiving component 550 may include hardware (e.g., one or more processor modules of the one or more processors 503) and/or computer-readable code or instructions stored in memory 504 and executable by at least one of the one or more processors 503 to perform the specially configured indicator receiving operations described herein. For instance, the one or more processors 503 and/or memory 504 may execute actions or operations defined by a power operation mode managing component 552 for managing the power operation mode over the second connection to WLAN AP 506. In an aspect, for example, power operation mode managing component 552 may include hardware (e.g., one or more processor modules of the one or more processors 503) and/or computer-readable code or instructions stored in memory 504 and executable by at least one of the one or more processors 503 to perform the specially configured power operation mode managing operations described herein. As described above, in one example, the power consumption mode may relate to a mode where the UE 515 consumes power for transmitting and/or receiving wireless communications over a related connection.

For instance, the one or more processors 503 and/or memory 504 may optionally execute actions or operations defined by a packet reordering component 554 for reordering packets received over the first and second connections, where the packet reordering component 554 may include a packet reorder timer 556 after which packets within reorder window which are not received can be dropped. In an aspect, for example, packet reordering component 554 may include hardware (e.g., one or more processor modules of the one or more processors 503) and/or computer-readable code or instructions stored in memory 504 and executable by at least one of the one or more processors 503 to perform the specially configured packet reordering operations described herein. For example, the packet reorder timer 556 can be initialized based on a configured value (e.g., configured from memory 504 of UE 515, a network configuration received from one or more eNodeBs, such as eNodeB 505, or other network entities, etc.). In addition, the packet reorder timer 556 can be tolled when it is detected that packets are received out-of-order, and based on expiration of the packet reorder timer 556, packet reordering component 554 may indicate that packet reordering is unsuccessful (and/or may drop out-of-order packets).

For instance, the one or more processors 503 and/or memory 504 may optionally execute actions or operations defined by a DRX inactivity timer 558 after which the first connection with eNodeB 505 may enter a power operation mode, and/or an on-duration timer 560 after expiration of which, the UE 515 can exit the power operation mode to allow the eNodeB 505 to initiate a downlink transmission to the UE 515 over the first connection. In an aspect, for example, DRX inactivity timer 558 and/or an on-duration timer 560 may be implemented by, or otherwise managed by, hardware (e.g., one or more processor modules of the one or more processors 503) and/or computer-readable code or instructions stored in memory 504 and executable by at least one of the one or more processors 503, to be initialized, tolled, etc., as described further herein.

Similarly, in an aspect, eNB 505 may include one or more processors 553 and/or a memory 555 that may be communicatively coupled, e.g., via one or more buses 557, and may operate in conjunction with or otherwise implement a scheduling component 520 for communicating with a UE 515 over first communication link 525, and for communicating with the UE 515 using RAN aggregation via WLAN AP 506 over second communication link 526. In an example, scheduling component 520 can communicate with WLAN AP 506 over backhaul link 532, for example, to provide data to WLAN AP 506 (e.g., packets or other data units at the application, TCP, UDP, IP, PDCP, RLC or MAC layer, as described above) in traffic aggregation for communicating to the UE 515, receive data from the WLAN AP 506 communicated thereto by the UE 515, etc. For example, the various functions related to scheduling component 520 may be implemented or otherwise executed by one or more processors 553 and, in an aspect, can be executed by a single processor, while in other aspects, different ones of the functions may be executed by a combination of two or more different processors, as described above. It is to be appreciated, in one example, that the one or more processors 553 and/or memory 555 may be configured as described in examples above with respect to the one or more processors 503 and/or memory 504 of UE 515.

In an example, the one or more processors 553 and/or memory 555 may execute actions or operations defined by scheduling component 520 or its subcomponents. For instance, the one or more processors 553 and/or memory 555 may execute actions or operations defined by a power operation mode determining component 522 for determining whether a connection between the WLAN AP 506 and the UE 515 (e.g., a connection over communication link 526) is in a power operation mode. In an aspect, for example, power operation mode determining component 522 may include hardware (e.g., one or more processor modules of the one or more processors 553) and/or computer-readable code or instructions stored in memory 555 and executable by at least one of the one or more processors 553 to perform the specially configured power operation mode determining operations described herein. For instance, the one or more processors 553 and/or memory 555 may execute actions or operations defined by a data scheduling component 524 for scheduling data over the connection between the WLAN AP 506 and the UE 515 and/or the eNodeB 505 and UE 515 based at least in part on whether the connection between the WLAN AP 506 and the UE 515 is in the power operation mode. In an aspect, for example, data scheduling component 524 may include hardware (e.g., one or more processor modules of the one or more processors 553) and/or computer-readable code or instructions stored in memory 555 and executable by at least one of the one or more processors 553 to perform the specially configured data scheduling operations described herein.

For instance, the one or more processors 553 and/or memory 555 may optionally execute actions or operations defined by a buffer size determining component 527 for determining a buffer size related to a buffer for communicating with the UE 515. In an aspect, for example, buffer size determining component 527 may include hardware (e.g., one or more processor modules of the one or more processors 553) and/or computer-readable code or instructions stored in memory 555 and executable by at least one of the one or more processors 553 to perform the specially configured buffer size determining operations described herein. For instance, the one or more processors 553 and/or memory 555 may optionally execute actions or operations defined by an indicator transmitting component 528 for transmitting an indicator to exit the power operation mode to the UE 515. In an aspect, for example, indicator transmitting component 528 may include hardware (e.g., one or more processor modules of the one or more processors 553) and/or computer-readable code or instructions stored in memory 555 and executable by at least one of the one or more processors 553 to perform the specially configured indicator transmitting operations described herein. For instance, the one or more processors 553 and/or memory 555 may optionally execute actions or operations defined by mode information receiving component 530 for receiving information of the power operation mode from the WLAN AP 506. In an aspect, for example, mode information receiving component 530 may include hardware (e.g., one or more processor modules of the one or more processors 553) and/or computer-readable code or instructions stored in memory 555 and executable by at least one of the one or more processors 553 to perform the specially configured mode information receiving operations described herein.

It is to be appreciated that transceivers 509, 559 may be configured to transmit and receive wireless signals through one or more antennas, an RF front end, one or more transmitters, and one or more receivers. In an aspect, transceivers 509, 559 may be tuned to operate at specified frequencies such that UE 515 and/or eNB 505 can communicate at a certain frequency. In an aspect, the one or more processors 503 may configure transceiver 509 and/or one or more processors 553 may configure transceiver 559 to operate at a specified frequency and power level based on a configuration, a communication protocol, etc. to communicate uplink signals and/or downlink signals, respectively, over related uplink or downlink communication channels.

In an aspect, transceivers 509, 559 can operate in multiple bands (e.g., using a multiband-multimode modem, not shown) such to process digital data sent and received using transceivers 509, 559. In an aspect, transceivers 509, 559 can be multiband and be configured to support multiple frequency bands for a specific communications protocol. In an aspect, transceivers 509, 559 can be configured to support multiple operating networks and communications protocols. Thus, for example, transceivers 509, 559 may enable transmission and/or reception of signals based on a specified modem configuration.

Figure 6:
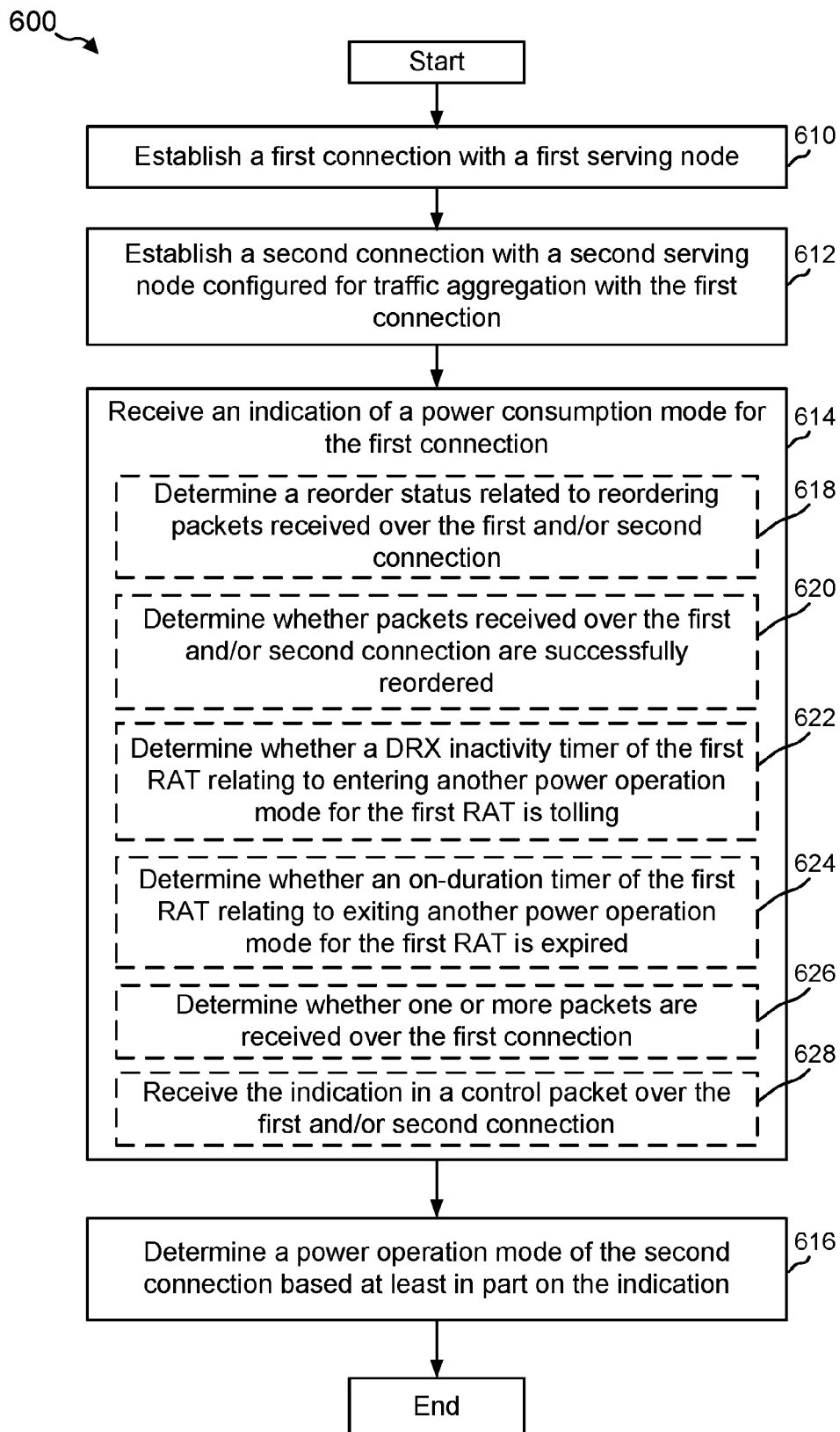
FIG. 6 is a flowchart illustrating a method for determining a power operation mode in accordance with various aspects of the present disclosure.

FIG. 6 illustrates a method 600 for determining (e.g., by a UE) a power operation mode for one or more traffic aggregated connections. As described, providing traffic aggregation can improve connectivity of the UE 515 with the network related to eNodeB 505 because eNodeB 505 can manage connection to eNodeB 505 and WLAN AP 506. Accordingly, method 600 includes, at Block 610, establishing a first connection with a first serving node. In an aspect, communicating component 540, e.g., in conjunction with one or more processors 503, memory 504, and/or transceiver 509, can establish the first connection (e.g., communication link 525) with the first serving node (e.g., eNodeB 505). For example, communicating component 540 can establish the first connection using a first RAT (e.g., LTE or other UMTS or cellular technology, etc.). In an example, communicating component 540 can perform a random access procedure with the eNodeB 505 or can otherwise request establishment of the connection therewith.

Method 600 also includes, at Block 612, establishing a second connection with a second serving node, where the second connection is configured for traffic aggregation with the first connection. For example, communicating component 540, e.g., in conjunction with one or more processors 503, memory 504, and/or transceiver 509, can establish the second connection (e.g., communication link 526) with the second serving node (e.g., WLAN AP 506, another eNodeB or cell, etc.), where the second connection is configured for traffic aggregation with the first connection. In one example, communicating component 540 can establish the second connection using the first RAT or using a second RAT (e.g., Wi-Fi). Communicating component 540 can establish the second connection, for example, based on requesting connection with the WLAN AP 506 and performing any billing/authentication procedures therewith, etc. In an example, eNodeB 505 can facilitate the connection between the UE 515 and WLAN AP 506 to provide traffic aggregation via the WLAN AP 506, as described. For example, eNodeB 505 may instruct the UE 515 to establish the second connection with WLAN AP 506, may provide instructions for establishing the second connection, etc. In any case, UE 515 can communicate with WLAN AP 506 over the second connection, and the WLAN AP 506 may communicate UE 515 data to eNodeB 505 as described, where the first and second connections are configured to provide traffic aggregation.

In addition, as described, communicating component 540 can receive data from the eNodeB 505 over communication link 525 and from WLAN AP 506 over communication link 526 in traffic aggregation, and packet reordering component 554 can reorder the packets, which may be received out-of-order due to concurrently receiving packets over the multiple links. For example, the data can be split over the links at the PDCP layer, and thus packet reordering component 554 can reorder the packets based at least in part on a PDCP sequence number associated therewith.

Method 600 may also include, at Block 614, receiving an indication of a power consumption mode for the first connection. For example, indicator receiving component 550, e.g., in conjunction with one or more processors 503, memory 504, and/or transceiver 509, can receive the indication of the power consumption mode for the first connection. As described above and further herein, the indication of the power consumption mode can relate to substantially any indication from which a consumption of power to receive data can be inferred at the UE 515. The indication can indicate, for example, that data is being received or is to be received over the first connection, and/or that the second connection may be used to aggregate transmission of the data to the UE 515.

In any case, method 600 also include, at Block 616, determining a power operation mode of the second connection based at least in part on the indication. For example, power operation mode managing component 552, e.g., in conjunction with one or more processors 503, memory 504, and/or transceiver 509, can determine the power operation mode of the second connection based at least in part on the indication. For instance, in determining the power operation mode, power operation mode managing component 552 can determine to exit a power operation mode (e.g., enter an idle mode, a power save mode, or other mode related to saving power consumption at the UE 515) where the indication relates to receiving communications over the first connection and/or possibly the second connection. In this regard, for example, the power operation mode over the second connection can be terminated such to receive communications over the second connection when desired for RAN aggregation.

Accordingly, in an example, receiving the indication of the power consumption mode at Block 614 may optionally include, at Block 618, determining a reorder status related to reordering packets received over the first and/or second connection. In an aspect, indicator receiving component 550, e.g., in conjunction with one or more processors 503, memory 504, and/or transceiver 509, can determine the reorder status related to reordering the packets received over the first and/or second connection. For example, packet reordering component 554 can generate the reorder status, which can indicate whether a plurality of packets are successfully reordered (e.g., before expiration of the packet reorder timer 556), a value of the packet reorder timer 556, an indication of whether the packet reorder timer 556 has expired, etc. In this case, for example, power operation mode managing component 552 can determine to exit the power operation mode (e.g. for the WLAN link) where the indicator receiving component 550 at least one of determines that the reorder status is unsuccessful, determines that the packet reorder timer 556 has reached a threshold value (e.g., an expiration value, a difference from the expiration value, etc.) or has expired, or based on amount of traffic in memory waiting to be reordered, and/or the like, in an attempt to receive communications pending for the second connection at the WLAN AP 506 before reordering is deemed unsuccessful (e.g., before the packet reorder timer 556 expires).

In one example, power operation mode managing component 552 can notify the packet reordering component 554 when an interface of communicating component 540 that communicates over communication link 526 enters the power operation mode for the second connection. In one example, packet reordering component 554 operates at a PDCP or MAC layer to reorder packets received from eNodeB 505 and WLAN AP 506. Where the packet reorder timer 556 is tolling and packet reordering component 554 determines that the second connection is in the power operation mode (e.g., that the associated interface of communicating component 540 is in the power operation mode), packet reordering component 554 can instruct the communicating component 540 to exit the power operation mode (e.g., transition to an active mode to receive communications) over the second connection, poll the WLAN AP 506 for buffered data (e.g., via the PS-Poll mechanism), etc. This may occur, for example, based on packet reordering component 554 determining at least one of the packet reorder timer 556 reaching a certain value, expiration of the packet reorder timer 556, the packet reorder timer 556 beginning to toll, etc. In any case, exiting the power operation mode, polling for buffered data, etc. can allow the UE 515 to receive buffered PDCP packets from the WLAN AP 506 before expiry of the packet reorder timer 556 (and possible dropping of out-of-order packets), and hence can avoid data loss and in addition deliver the reordered stream earlier which minimizes memory consumption and improves the user experience. Alternatively to using PS-Poll, the device may temporarily schedule data traffic on the WLAN uplink in order to exit the power save mode. This may be more efficient than using the PS-poll since the power save control indicating that power operation mode has been exited can be piggybacked onto user data.

Figure 7:
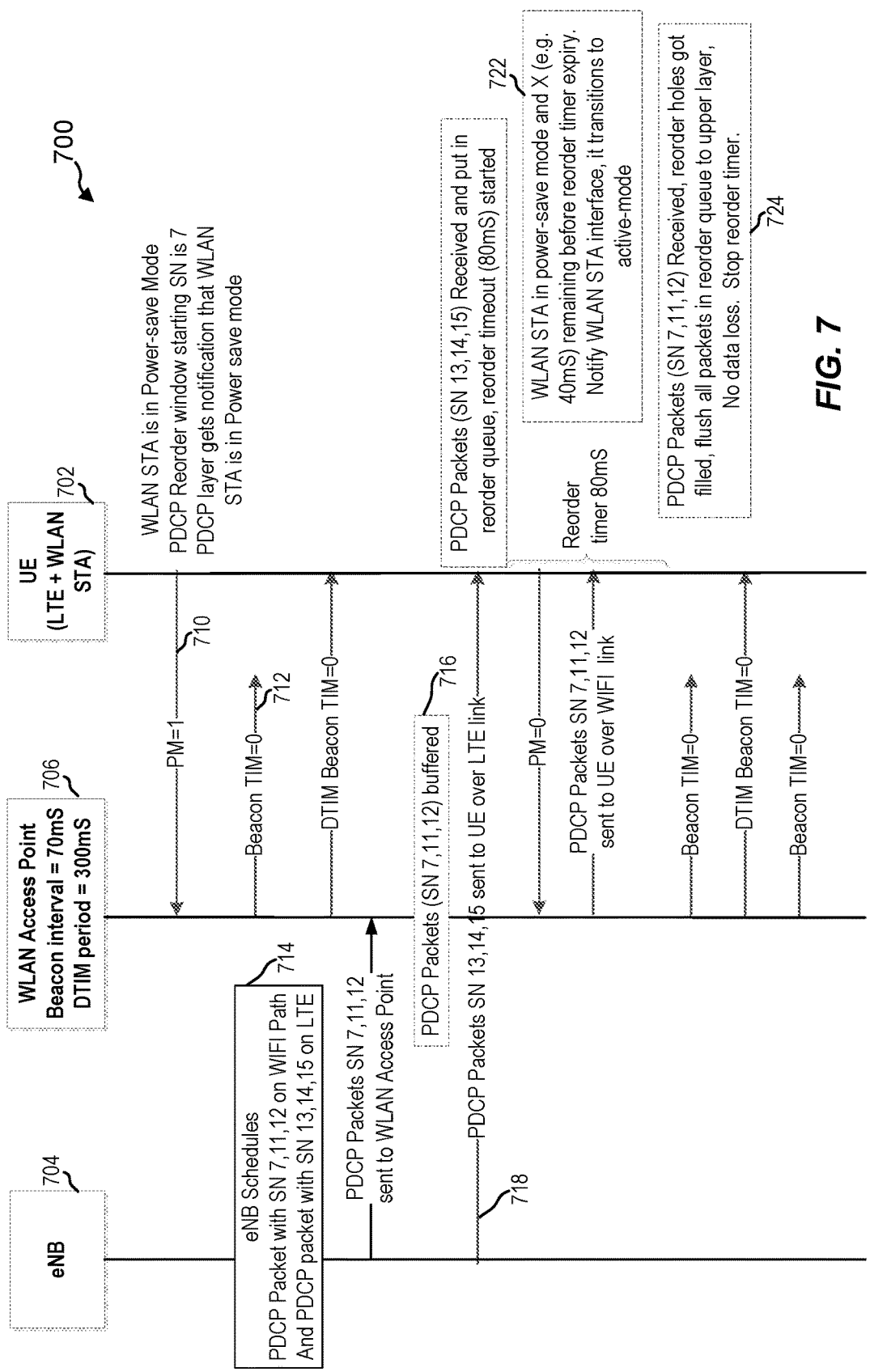
FIG. 7 is a block diagram conceptually illustrating an example of a wireless communications system, in accordance with various aspects of the present disclosure.

A specific example of this is shown in FIG. 7, which depicts an example system 700 for communicating packets between a UE 702, WLAN AP 706, and eNodeB 704. In system 700, the UE WLAN STA interface enters a power-save mode with the WLAN AP 706 at 710. The WLAN AP 706 periodically transmits beacon TIM (e.g., at a beacon interval of 70 ms and/or a DTIM interval of 280 ms). For example, WLAN AP transmits beacon TIM 712 indicating 0 (no traffic). At 714, eNodeB 704 schedules various PDCP packets, including sequence numbers 7, 11, and 12 for transmitting by WLAN AP 706 and 12, 14, and 15 for transmitting by eNodeB 704. Because the WLAN AP 706 is in power save mode with UE 702, packets 7, 11, and 12 are buffered at 716 until the power save mode is terminated. Meanwhile, eNodeB 704 transmits packets 13, 14, and 15 to UE 702 at 718. UE 702 can transition to active mode (e.g., terminating the power save mode) at 722 with a time remaining before reorder timer expiry based on receiving out-of-order packets from the eNodeB 704 (e.g., and/or based on detecting that at least a threshold time remains at the reorder timer). Accordingly, at 724, the buffered packets 7, 11, and 12 are received and reorder holes are filled with no data loss.

In addition, for example, receiving the indication of the power consumption mode at Block 614 may optionally include, at Block 620, determining whether packets received over the first and/or second connection are successfully reordered. In an aspect, indicator receiving component 550, e.g., in conjunction with one or more processors 503, memory 504, and/or transceiver 509, can determine whether packets received over the first and/or second connection are successfully received (e.g., whether a gap in sequence number is filled). For example, indicator receiving component 550 can make this determination based at least in part on packet reordering component 554 attempting to reorder packets received over communication links 525 and 526, and notifying the indicator receiving component 550 when packets are successfully reordered and/or cannot be successfully reordered (e.g., based on expiration of the packet reorder timer 556). Moreover, in an example, where packet reordering component 554 notifies indicator receiving component 550 of successful packet reordering, indicator receiving component 550 can instruct power operation mode managing component 552 that the communicating component 540 may enter the power operation mode over the second connection (e.g., that an interface related to the second connection may enter a power operation mode), which may be subject to other considerations at the power operation mode managing component 552.

In addition, for example, LTE can utilize DRX to enable a power operation mode (e.g., power saving mode) at the UE 515, where the eNodeB 505 and UE 515 maintain the same state machine for DRX, which enables the eNodeB 505 to transmit to the UE 515 at times when it is receiving, and the UE 515 to sleep (e.g., suspend radio resources) at other times. Thus, in one example, power operation mode managing component 552 can manage the power operation mode for the second connection based at least in part on the power operation mode (e.g., DRX) for the first connection. DRX defines various timers and when one of them is tolling, the UE 515 cannot sleep (e.g., suspend radio resources for the first connection). These timers include the DRX inactivity timer 558, which starts when the UE 515 is scheduled by the eNodeB 505 (e.g., by scheduling component 520) to receive downlink transmissions, and the on-duration timer 560, which runs periodically every DRX cycle.

Thus, in this example, receiving the indication of the power consumption mode at Block 614 may optionally include, at Block 622, determining whether a DRX inactivity timer of the first RAT related to entering another power operation mode for the first RAT is tolling. In an aspect, indicator receiving component 550, e.g., in conjunction with one or more processors 503, memory 504, and/or transceiver 509, can determine whether the DRX inactivity timer 558 of the first RAT relating to entering another power operation mode for the first RAT (e.g., over communication link 525) is tolling. For example, tolling can refer to a timer having been initialized to a value and being incremented/decremented based on a clock of a corresponding processor until the timer reaches zero as a lower bound (e.g., where the timer counts down and thus tolling decreases the timer value over time) or the timer value as an upper bound (e.g., where the timer counts up and thus tolling increases the timer value over time). Communicating component 540 can start/re-start the DRX inactivity timer 558 when a downlink transmission is received from the eNodeB 505. Thus, where indicator receiving component 550 determines that the DRX inactivity timer is tolling, it can instruct power operation mode managing component 552 to exit a power operation mode over the second connection. Power operation mode managing component 552 can cause communicating component 540 to exit the power operation mode (e.g., over an interface related to the second connection), perform a PS-Poll to the WLAN AP 506 over the second connection, etc. This can avoid unsuccessful reordering of packets as the receiving of downlink transmissions from eNodeB 505, which causes tolling of the DRX inactivity timer 558, results in exiting the power operation mode over the second connection. Moreover, for example, indicator receiving component 550 may first determine that receiving a downlink transmission (as opposed to transmitting an uplink transmission) caused the DRX inactivity timer 558 in order to begin tolling before instructing power operation mode managing component 552 to exit the power operation mode.

In another example, receiving the indication of the power consumption mode at Block 614 may optionally include, at Block 624, determining whether an on-duration timer of the first RAT related to exiting another power operation mode for the first RAT is expired. In an aspect, indicator receiving component 550, e.g., in conjunction with one or more processors 503, memory 504, and/or transceiver 509, can determine whether the on-duration timer 560 of the first RAT relating to exiting another power operation mode for the first RAT (e.g., over communication link 525) is expired. For example, the on-duration timer 560 can cause the UE 515 to exit a power operation mode over the first connection to allow the eNodeB 505 to initiate downlink transmissions to the UE 515 periodically every DRX cycle. Thus, when this timer 560 expires, power operation mode managing component 552 exits the power operation mode for the first connection (e.g., by instructing the communicating component 540 to exit the power operation mode on a related interface). Thus, where indicator receiving component 550 determines expiration of the on-duration timer 560, it can instruct power operation mode managing component 552 to exit the power operation mode for the second connection (e.g., over an interface related to the second connection), perform a PS-Poll to the WLAN AP 506 over the second connection, etc. As described, this can avoid unsuccessful reordering of packets since the second connection is activated when the first connection is activated based on expiration of the on-duration timer 560. It is to be appreciated, though not shown, that the eNodeB 505 can manage similar DRX inactivity and on-duration timers (e.g., in providing a similar DRX state machine as the UE 515) for determining when to transmit communications to WLAN AP 506 for transmitting over the second connection.

In a further example, receiving the indication of the power consumption mode at Block 614 may optionally include, at Block 626, determining whether one or more packets are received over the first connection. In an aspect, indicator receiving component 550, e.g., in conjunction with one or more processors 503, memory 504, and/or transceiver 509, can determine whether one or more packets are received over the first connection, which can include determining such information from communicating component 540. When indicator receiving component 550 determines that one or more packets are received by the communicating component 540 over the first connection, for example, indicator receiving component 550 can instruct power operation mode managing component 552 to exit the power operation mode for the second connection (e.g., over an interface related to the second connection), perform a PS-Poll to the WLAN AP 506 over the second connection, etc. This can avoid unsuccessful reordering of packets since the second connection is activated when packets are received over the first connection, and thus packets can be received over the second connection as well likely before expiration of the packet reorder timer 556.

Still, in another example, receiving the indication of the power consumption mode at Block 614 may optionally include, at Block 628, receiving the indication in a control packet over the first and/or second connection. In an aspect, indicator receiving component 550, e.g., in conjunction with one or more processors 503, memory 504, and/or transceiver 509, can receive the indication in the control packet (e.g., PDCP control PDU) over the first and/or second connection. As described in further detail below, eNodeB 505 (and/or WLAN AP 506) may transmit the indication in the control packet to the UE 515. For example, eNodeB 505 (and/or WLAN AP 506) may transmit the control packet based on obtaining a data burst for transmitting the UE 515 (and/or along with transmitting the burst). In one example, the beginning of the burst may include the control packet. In any case, when indicator receiving component 550 receives the control packet, indicator receiving component 550 can instruct power operation mode managing component 552 to exit the power operation mode for the second connection (e.g., over an interface related to the second connection), perform a PS-Poll to the WLAN AP 506 over the second connection, etc. For example, the control packet may specify a time to exit the power operation mode, a periodic pattern for entering/leaving the power operation mode, etc., and indicator receiving component 550 can accordingly instruct the power operation mode managing component 552 based on the indication. In any case, this can avoid unsuccessful reordering of packets since the eNodeB 505 (and/or WLAN AP 506) can cause the UE 515 to exit the power operation mode over the second connection when it has data to be transmitted over the second connection. In addition, for example, power operation mode managing component 552 may manage the second connection to stay out of the power operation mode at least until another control packet is received indicating that the UE 515 is allowed to enter the power operation mode over the second connection.

Figure 8:
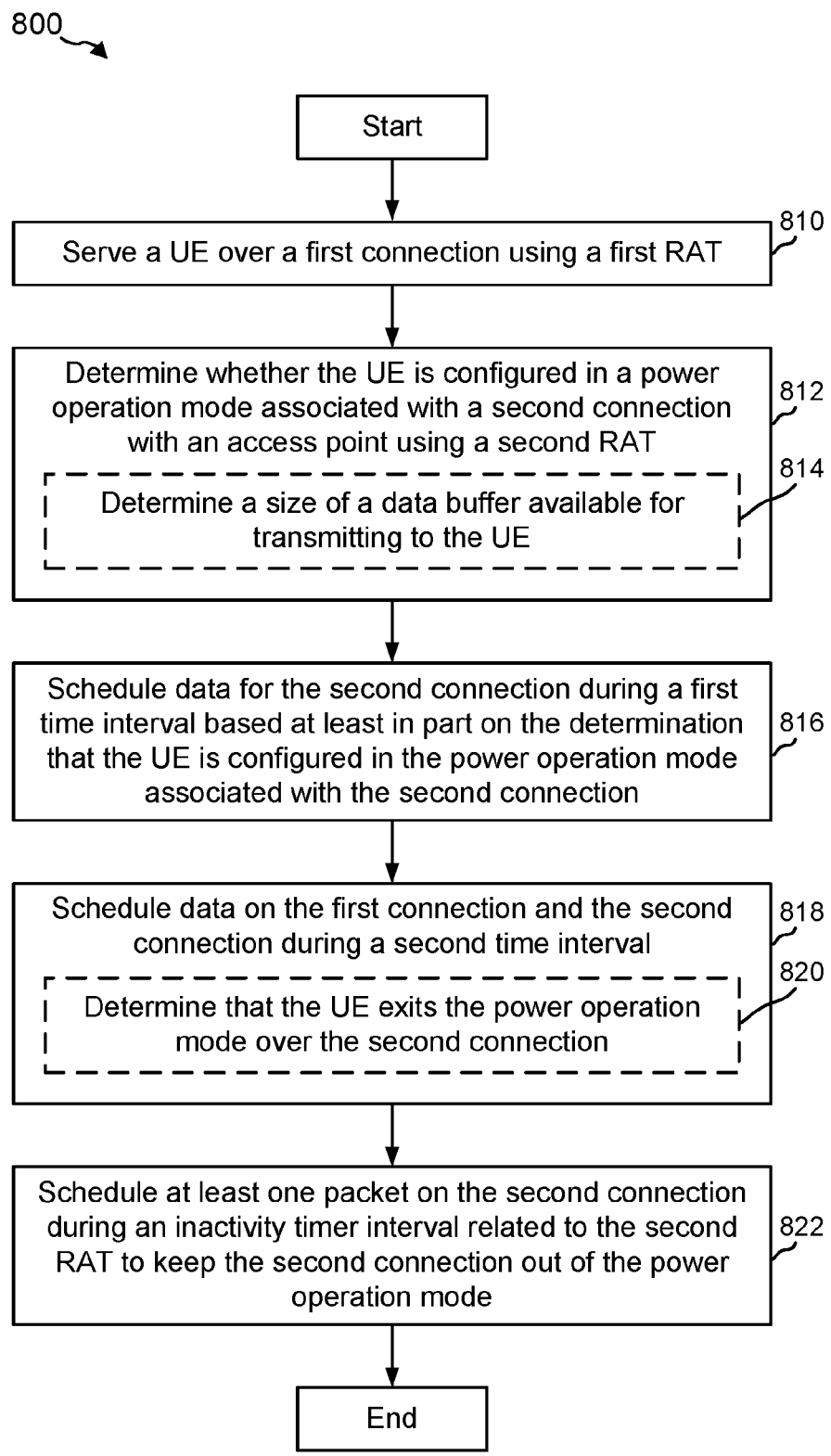
FIG. 8 is a flowchart illustrating a method for scheduling communications in accordance with various aspects of the present disclosure.

FIG. 8 illustrates an example method 800 for determining (e.g., by an eNB) when to schedule data over a connection in traffic aggregation where the connection may be in a power operation mode. Method 800 includes, at Block 810, serving a UE over a first connection using a first RAT. In an aspect, scheduling component 520, e.g., in conjunction with one or more processors 553, memory 555, and/or transceiver 559, can serve the UE 515 over the first connection (e.g., communication link 525) using a first RAT (e.g., LTE or other UMTS or cellular technology). For example, as described, the UE 515 may perform a random access procedure or otherwise request resources for communicating with the eNodeB 505, and eNodeB 505 may accordingly grant resources to the UE 515 over communication link 525. In addition, as described, scheduling component 520 may aggregate traffic to the UE 515 over another communication link 526 established between the UE 515 and a WLAN AP 506 based at least in part on communicating data to/from the WLAN AP 506 over backhaul link 534.

Method 800 also includes, at Block 812, determining whether the UE is configured in a power operation mode associated with a second connection with an access point using a second RAT. In an aspect, power operation mode determining component 522, e.g., in conjunction with one or more processors 553, memory 555, and/or transceiver 559, can determine whether the UE (e.g., UE 515) is configured in the power operation mode associated with the second connection (e.g., communication link 526) with the access point (e.g., WLAN AP 506) using a second RAT (e.g., Wi-Fi). For example, power operation mode determining component 522 may receive an indication of whether the UE 515 is in the power operation mode from WLAN AP 506 and/or UE 515, which may be based on a request to the WLAN AP 506 and/or UE 515 or otherwise (e.g., a notification received from the WLAN AP 506 or UE 515 upon the UE 515 entering the power operation mode over the second connection), etc.

In another example, determining whether the UE 515 is configured in the power operation mode over the second connection at Block 812 may include, at Block 814, determining a size of a data buffer available for transmitting to the UE. In an aspect, buffer size determining component 527, e.g., in conjunction with one or more processors 553, memory 555, and/or transceiver 559, can determine the size of the data buffer available for transmitting the UE 515. For example, buffer size determining component 527 can determine an available capacity size of the buffer, from which a power operation mode can be inferred (e.g., if the available capacity size of the buffer is below a threshold or is trending lower over a time period, etc.). For example, the buffer may correspond to the second connection or to communications for the UE 515 generally.

Method 800 may also include, at Block 816, scheduling data for the second connection during a first time interval based at least in part on the determination that the UE is configured in the power operation mode associated with the second connection. In an aspect, data scheduling component 524, e.g., in conjunction with one or more processors 553, memory 555, and/or transceiver 559, can schedule the data for the second connection (e.g., communication link 526) during the first time interval based at least in part on the determination that the UE (e.g., UE 515) is configured in the power operation mode associated with the second connection. For example, the data scheduling component 524 can assume the UE 515 entered the power operation mode for the second connection (e.g., based on the determination by power operation mode determining component 522 or otherwise) and can accordingly schedule data for sending over the communication link 526 during the time interval (so no data is sent over communication link 525). The data can then be buffered by WLAN AP 506 until the UE 515 exits the power operation mode. Specifically, in an example, communicating component 540 may periodically receive signals in the power operation mode, and may check for the TIM (e.g., as described in FIG. 7 above). In this regard, the TIM bitmap can indicate data available for transmission by the WLAN AP, and power operation mode managing component 552 can accordingly exit the power operation mode with the second connection to receive the buffered data.

Method 800 can also include, at Block 818, scheduling data on the first connection and the second connection during a second time interval. In an aspect, data scheduling component 524, e.g., in conjunction with one or more processors 553, memory 555, and/or transceiver 559, can schedule the data on the first connection and the second connection during the second time interval. Scheduling data on the first connection and the second connection during a second time interval at Block 818 may optionally, include, at Block 820, determining that the UE exits the power operation mode over the second connection. For example, power operation mode determining component 522 may determine that the UE 515 has exited the power operation mode over the second connection (e.g., based on receiving an indication from the WLAN AP 506, UE 515, etc., determining that an available buffer capacity for the UE 515 has increased or is increasing, etc., as described above). Based on this determination, for example, data scheduling component 524 can determine the second time interval has begun where the second connection is no longer in power operation mode at the UE 515, and data can thus be sent over the second connection. Thus, data scheduling component 524 additionally schedules data over the first connection to implement traffic aggregation.

In addition, eNodeB 505 can attempt to ensure the UE 515 does not reenter the power operation mode for the second connection during the second time interval. Thus, method 800 may optionally include, at Block 822, scheduling at least one packet on the second connection during an inactivity timer interval related to the second RAT to keep the second connection out of the power operation mode for a duration of the second time interval. In an aspect, data scheduling component 524, e.g., in conjunction with one or more processors 553, memory 555, and/or transceiver 559, can schedule the at least one packet on the second connection (e.g., communication link 526 via backhaul link 534 communications to the WLAN AP 506) during an inactivity timer interval related to the second RAT to keep the second connection out of the power operation mode. For example, the inactivity timer value, after which the UE 515 can enter the power operation mode for the second connection based on the second RAT, can be known by the eNodeB 505, and thus the at least one packet is scheduled inside of this inactivity time interval to avoid entering the power operation mode at the UE 515. In one example, eNodeB 505 can configure the inactivity timer value for the UE 515 (e.g., via RRC signaling). The inactivity timer value may be specifically used for determined inactivity over one or more connections in traffic aggregation. Moreover, for example, the data scheduling component 524 may cease scheduling the at least one packet on the second connection after a period of time and/or based on an event (e.g., an available capacity of a buffer related to transmitting to the UE 515 achieving a threshold), to allow the UE 515 to once again enter the power operation mode (e.g., after expiration of the inactivity timer).

Figure 9:
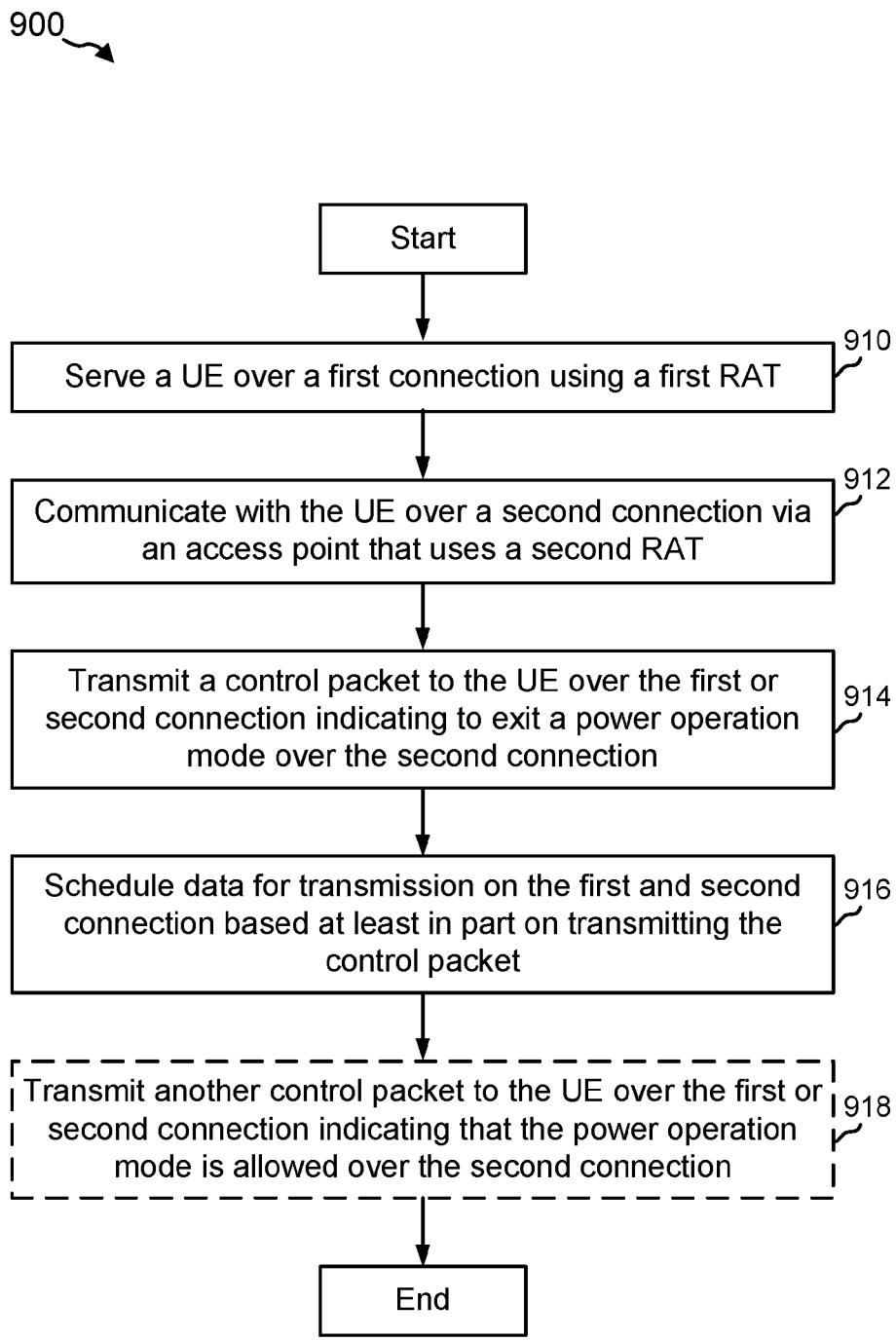
FIG. 9 is a flowchart illustrating a method for scheduling communications in accordance with various aspects of the present disclosure.

FIG. 9 illustrates an example method 900 for transmitting (e.g., by an eNB or eNodeB) a control packet to a UE to cause the UE to exit a power operation mode over a connection in traffic aggregation. Method 900 includes, at Block 910, serving a UE over a first connection using a first RAT. In an aspect, scheduling component 520, e.g., in conjunction with one or more processors 553, memory 555, and/or transceiver 559, can serve the UE 515 over the first connection (e.g., communication link 525) using a first RAT (e.g., LTE or other UMTS or cellular technology). For example, as described, the UE 515 may perform a random access procedure or otherwise request resources for communicating with the eNodeB 505, and eNodeB 505 may accordingly grant resources to the UE 515 over communication link 525.

Method 900 may also include, at Block 912, communicating with the UE over a second connection via an access point that uses a second RAT. In an aspect, scheduling component 520, e.g., in conjunction with one or more processors 553, memory 555, and/or transceiver 559, can communicate with the UE (e.g., UE 515) over the second connection (e.g., communication link 526) via an access point (e.g., WLAN AP 506) that uses a second RAT. As described, for example, scheduling component 520 may aggregate traffic to the UE 515 over another communication link 526 established between the UE 515 and a WLAN AP 506 based at least in part on communicating data to/from the WLAN AP 506 over backhaul link 534. In addition or alternative, scheduling component 520 may determine to use a reduced number of radio links when the data rate is determined to be below a threshold. This avoids or mitigates the issue of synchronizing the power save state across the plurality of radio links. For example, the threshold may depend on the link capacity achievable on one or more of the links, the load on a radio providing the one or more links, or similar radio quality metrics.

Method 900 also includes, at Block 914, transmitting a control packet to the UE over the first or second connection indicating to exit a power operation mode over the second connection. In an aspect, indicator transmitting component 528, e.g., in conjunction with one or more processors 553, memory 555, and/or transceiver 559, can transmit the control packet to the UE (e.g., UE 515) over the first or second connection indicating to exit the power operation mode over the second connection (e.g., communication link 526). The control packet may include a target time at which the device must exit the power save or it may include a duration of time for which the device stays out of the power save mode. As described, in an example, indicator transmitting component 528 can transmit the control packet at the beginning of a data burst for the UE 515, and indicator receiving component 550 can receive the control packet for determining to exit a power operation mode for the second connection.

Method 900 also includes, at Block 916, scheduling data for transmission on the first and second connection based at least in part on transmitting the control packet. In an aspect, data scheduling component 524, e.g., in conjunction with one or more processors 553, memory 555, and/or transceiver 559, can schedule data for transmission on the first and second connection based at least in part on transmitting the control packet. Thus, because the control packet can cause the power operation mode to terminate for the second connection, data can be received over the second connection, which can likely avoid reorder errors otherwise caused by the second connection being in a power operation mode.

Method 900 may optionally include, at Block 918, transmitting another control packet to the UE over the first or second connection indicating that the power operation mode is allowed over the second connection. In an aspect, indicator transmitting component 528, e.g., in conjunction with one or more processors 553, memory 555, and/or transceiver 559, can transmit the another control packet to the UE (e.g., UE 515) over the first or second connection indicating that the power operation mode is allowed over the second connection (e.g., communication link 526). Thus, indicator receiving component 550 may receive this control packet, and power operation mode managing component 552 may cause the communicating component 540 to enter the power operation mode for the second connection based at least in part on the control packet and/or other considerations (e.g., expiration of a related inactivity timer for the second connection).

Figure 10:
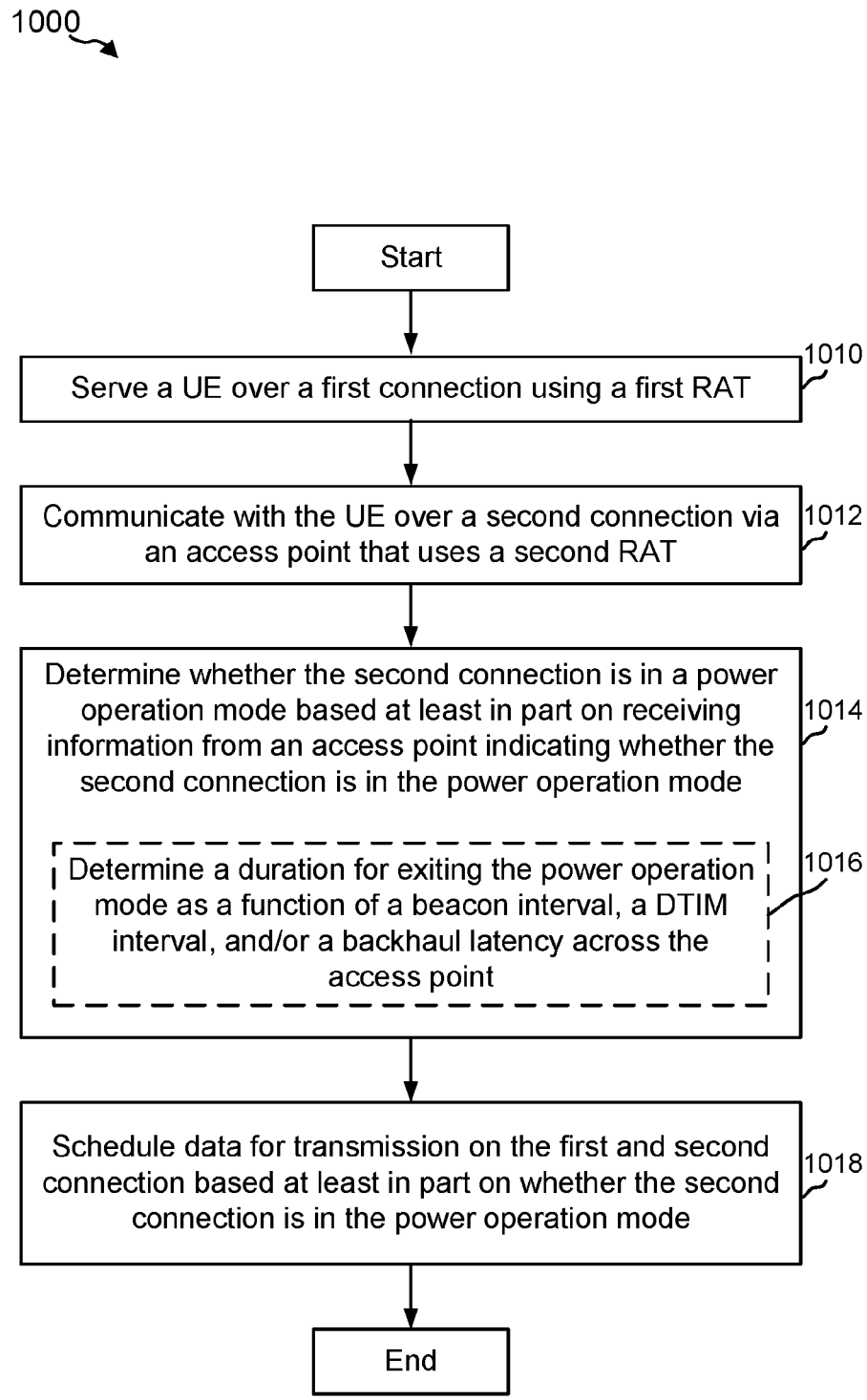
FIG. 10 is a flowchart illustrating a method for scheduling communications in accordance with various aspects of the present disclosure.

FIG. 10 illustrates an example method 1000 for determining (e.g., by an eNB or eNodeB) whether a UE is in a power operation mode over a connection in traffic aggregation. Method 1000 includes, at Block 1010, serving a UE over a first connection using a first RAT. In an aspect, scheduling component 520, e.g., in conjunction with one or more processors 553, memory 555, and/or transceiver 559, can serve the UE 515 over the first connection (e.g., communication link 525) using a first RAT (e.g., LTE or other UMTS or cellular technology). For example, as described, the UE 515 may perform a random access procedure or otherwise request resources for communicating with the eNodeB 505, and eNodeB 505 may accordingly grant resources to the UE 515 over communication link 525.

Method 1000 may also include, at Block 1012, communicating with the UE over a second connection via an access point that uses a second RAT. In an aspect, scheduling component 520, e.g., in conjunction with one or more processors 553, memory 555, and/or transceiver 559, can communicate with the UE (e.g., UE 515) over the second connection (e.g., communication link 526) via an access point (e.g., WLAN AP 506) that uses a second RAT. As described, for example, scheduling component 520 may aggregate traffic to the UE 515 over another communication link 526 established between the UE 515 and a WLAN AP 506 based at least in part on communicating data to/from the WLAN AP 506 over backhaul link 534.

Method 1000 may also include, at Block 1014, determining whether the second connection is in a power operation mode based at least in part on receiving information from an access point indicating whether the second connection is in the power operation mode. In an aspect, mode information receiving component 530, e.g., in conjunction with one or more processors 553, memory 555, and/or transceiver 559, can determine whether the second connection (e.g., communication link 526) is in the power operation mode based at least in part on receiving information from the access point (e.g., WLAN AP 506) indicating whether the second connection is in the power operation mode. For example, mode information receiving component 530 may receive the information from WLAN AP 506 over the backhaul link 534. In an example, determining whether the second connection is in the power mode at Block 1014 may optionally include, at Block 1016, determining a duration for exiting the power operation mode as a function of a beacon interval, a DTIM interval, and/or a backhaul latency across the access point. Mode information receiving component 530 can determine the duration for exiting the power operation mode as a function of the beacon interval, the DTIM interval, and/or the backhaul latency across the access point, which can be received by WLAN AP 506.

Accordingly, method 1000 may also include, at Block 1018, scheduling data for transmission on the first and second connection based at least in part on whether the second connection is in the power operation mode. In an aspect, data scheduling component 524, e.g., in conjunction with one or more processors 553, memory 555, and/or transceiver 559, can schedule data for transmission on the first and second connection based at least in part on whether the second connection is in the power operation mode. As described, where it is determined that the second connection is not in the power operation mode (e.g., based on the information received from WLAN AP 506), data scheduling component 524 can schedule data over both the first and second connections to provide traffic aggregation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the described aspects.

The various illustrative logical blocks, modules, and circuits described in connection with the aspects described herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the described aspects herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the described aspects is provided to enable any person skilled in the art to make or use the aspects. Various modifications to the aspects will be readily apparent to those skilled in the art, and the generic principles defined herein may be applied to other variations without departing from the spirit or scope of the aspects described herein. Thus, the aspects described herein are not intended to be limited to the examples and designs described herein, but it is to be accorded the widest scope consistent with the principles and novel features disclosed herein.

What is claimed is:

1. A method for wireless communications, comprising:
    establishing, by a user equipment (UE), a first connection with a first serving node;
    establishing, by the UE, a second connection with a second serving node, wherein the first connection and the second connection are configured for traffic aggregation at a network layer;
    receiving an indication of a power consumption mode for the first connection, wherein receiving the indication of the power consumption mode for the first connection comprises determining a reorder status related to reordering packets received over at least one of the first connection or the second connection; and
    switching, based at least in part on determining, from the indication, the power consumption mode for the first connection, a power operation mode of the second connection, wherein switching the power operation mode of the second connection comprises exiting the power operation mode based at least in part on determining the reorder status.

2. The method of claim 1, wherein the reorder status is based on at least one of a second indication that reordering is on-going or not on-going, a time remaining for a packet reorder timer, or a time since the packet reorder timer started.

3. The method of claim 1, wherein exiting the power operation mode comprises transmitting, over the second connection, at least one of the power save poll, or uplink user data with a piggybacked power save control indicating exiting of the power operation mode.

4. The method of claim 1, wherein receiving the indication of the power consumption mode from the first connection further comprises determining whether packets received over at least one of the first connection or the second connection are successfully reordered, and switching the power operation mode of the second connection is further based at least in part on determining that the packets are successfully reordered.

5. The method of claim 1, wherein receiving the indication of the power consumption mode from the first connection further comprises determining whether a discontinuous receive (DRX) inactivity timer of the first connection related to entering another power operation mode for the first connection following expiration of the DRX inactivity timer is tolling.

6. The method of claim 5, wherein determining that the DRX inactivity timer is tolling comprises determining that the DRX inactivity timer is tolling based on receiving a downlink transmission over the first connection.

7. The method of claim 1, wherein receiving the indication of the power consumption mode from the first connection further comprises determining whether an on-duration timer of the first connection related to exiting another power operation mode for the first connection following expiration of the on-duration timer is expired.

8. The method of claim 1, wherein receiving the indication is based at least in part on receiving or transmitting a packet over the first connection.

9. The method of claim 1, wherein receiving the indication further comprises receiving a control packet over the first connection or the second connection indicating to exit the power operation mode over the second connection.

10. The method of claim 9, wherein switching the power operation mode further comprises determining, based on the control packet, to remain out of the power operation mode until another control packet is received over the first connection or the second connection indicating that the power operation mode is allowed for the second connection.

11. The method of claim 9, wherein the control packet indicates at least one of a time at which to enter the power operation mode or a time at which to leave the power operation mode.

12. The method of claim 9, wherein the control packet defines at least one of a periodic pattern of entering the power operation mode or a periodic pattern of leaving the power operation mode.

13. An apparatus for wireless communications, comprising:
a transceiver;
a memory configured to store instructions; and
at least one processor communicatively coupled with the transceiver and the memory, wherein the at least one processor is configured to:
establish a first connection with a first serving node;
establish a second connection with a second serving node, wherein the first connection and the second connection are configured for traffic aggregation at a network layer;
receive an indication of a power consumption mode for the first connection, wherein the at least one processor is configured to receive the indication of the power consumption mode for the first connection based at least on determining a reorder status related to reordering packets received over at least one of the first connection or the second connection; and
switch, based at least in part on determining, from the indication, the power consumption mode for the first connection, a power operation mode of the second connection, wherein the at least one processor is configured to switch the power operation mode of the second connection based at least on exiting the power operation mode based at least on determining the reorder status.

14. The apparatus of claim 13, wherein the reorder status is based on at least one of a second indication that reordering is on-going or not on-going, a time remaining for a packet reorder timer, or a time since the packet reorder timer started.

15. The apparatus of claim 13, wherein the at least one processor is configured to receive the indication of the power consumption mode from the first connection further based at least on determining whether packets received over at least one of the first connection or the second connection are successfully reordered, and wherein the at least one processor is configured to switch the power operation mode of the second connection further based at least on determining that the packets are reordered.

16. The apparatus of claim 13, wherein the at least one processor is configured to receive the indication of the power consumption mode from the first connection further based at least on determining whether a discontinuous receive (DRX) inactivity timer of the first connection related to entering another power operation mode for the first connection following expiration of the DRX inactivity timer is tolling.

17. The apparatus of claim 16, wherein the at least one processor is configured to determine that the DRX inactivity timer is tolling based on receiving a downlink transmission over the first connection.

18. The apparatus of claim 13, wherein the at least one processor is configured to receive the indication of the power consumption mode from the first connection further based at least on determining whether an on-duration timer of the first connection related to exiting another power operation mode for the first connection following expiration of the on-duration timer is expired.

19. The apparatus of claim 13, wherein the at least one processor is configured to receive the indication based at least in part on receiving a packet over the first connection.

20. The apparatus of claim 13, wherein the at least one processor is configured to receive the indication further based at least on receiving a control packet over the first connection or the second connection indicating to exit the power operation mode over the second connection.

21. The apparatus of claim 20, wherein the at least one processor is configured to exit the power operation mode based on determining to remain out of the power operation mode until another control packet is received over the first connection or the second connection indicating that the power operation mode is allowed for the second connection.

22. The apparatus of claim 20, wherein the control packet indicates at least one of a time or a periodic pattern based on which to enter the power operation mode or a time or periodic pattern based on which to leave the power operation mode.

23. An apparatus for wireless communications, comprising:
means for establishing a first connection with a first serving node;

means for establishing a second connection with a second serving node, wherein the first connection and the second connection are configured for traffic aggregation at a network layer;
means for receiving an indication of a power consumption mode for the first connection, wherein the means for receiving receives the indication of the power consumption mode for the first connection based at least on determining a reorder status related to reordering packets received over at least one of the first connection or the second connection; and
means for switching, based at least in part on determining, from the indication, the power consumption mode for the first connection, a power operation mode of the second connection, wherein the means for switching switches the power operation mode of the second connection based at least on exiting the power operation mode based at least in part on determining the reorder status.

24. The apparatus of claim 23, wherein the reorder status is based on at least one of a second indication that reordering is on-going or not on-going, a time remaining for a packet reorder timer, or a time since the packet reorder timer started.

25. The apparatus of claim 23, wherein exiting the power operation mode comprises transmitting, over the second connection, at least one of the power save poll, or uplink user data with a piggybacked power save control indicating exiting of the power operation mode.

26. The apparatus of claim 23, wherein the means for receiving receives the indication based at least in part on receiving or transmitting a packet over the first connection.

27. A non-transitory computer-readable storage medium comprising computer-executable code for wireless communication, the code comprising:
code for establishing a first connection with a first serving node;
code for establishing a second connection with a second serving node, wherein the first connection and the second connection are configured for traffic aggregation at a network layer;
code for receiving an indication of a power consumption mode for the first connection, wherein the code for receiving receives the indication of the power consumption mode for the first connection based at least on determining a reorder status related to reordering packets received over at least one of the first connection or the second connection; and
code for switching, based at least in part on determining, from the indication, the power consumption mode for the first connection, a power operation mode of the second connection, wherein the code for switching switches the power operation mode of the second connection based at least on exiting the power operation mode based at least in part on determining the reorder status.

28. The non-transitory computer-readable storage medium of claim 27, wherein the reorder status is based on at least one of a second indication that reordering is on-going or not on-going, a time remaining for a packet reorder timer, or a time since the packet reorder timer started.

29. The non-transitory computer-readable storage medium of claim 27, wherein exiting the power operation mode comprises transmitting, over the second connection, at least one of the power save poll, or uplink user data with a piggybacked power save control indicating exiting of the power operation mode.

30. The non-transitory computer-readable storage medium of claim 27, wherein the code for receiving receives the indication based at least in part on receiving or transmitting a packet over the first connection.

* * * * *